United States Patent [19]
Savant et al.

[11] Patent Number: 6,113,801
[45] Date of Patent: Sep. 5, 2000

[54] METHOD OF MAKING COLORED REPLICAS AND COMPOSITIONS FOR USE THEREWITH

[75] Inventors: Gajendra D. Savant; Abbas Hosseini, both of Torrance, Calif.

[73] Assignee: Physical Optics Corporation, Torrance, Calif.

[21] Appl. No.: 08/922,408

[22] Filed: Sep. 3, 1997

Related U.S. Application Data

[63] Continuation-in-part of application No. 08/800,872, Feb. 14, 1997, Pat. No. 5,922,238.

[51] Int. Cl.[7] .............................. C09K 3/00; B29D 7/00; B29D 11/00; G02F 1/13

[52] U.S. Cl. .............................. 252/1; 216/24; 264/1.34; 264/2.5; 349/64; 349/62; 430/321; 435/309.4

[58] Field of Search ........................ 252/299.01; 349/62, 349/78, 64; 385/146; 264/1.34, 2.5; 428/13; 216/24; 435/309.4; 430/321; 359/267; 427/162

[56] References Cited

U.S. PATENT DOCUMENTS

| | | | |
|---|---|---|---|
| 4,474,868 | 10/1984 | Yamaoka et al. | 430/281 |
| 5,093,306 | 3/1992 | Mukoyoshi et al. | 503/227 |
| 5,212,271 | 5/1993 | Beckett et al. | 526/301 |
| 5,346,954 | 9/1994 | Wu et al. | 525/85 |
| 5,354,723 | 10/1994 | Gundjian | 503/201 |
| 5,650,865 | 7/1997 | Smith | 359/15 |
| 5,735,988 | 4/1998 | Chau et al. | 156/209 |
| 5,869,179 | 2/1999 | Cahill et al. | 428/354 |

FOREIGN PATENT DOCUMENTS 62-212436 9/1987 Japan.

Primary Examiner—Shean C. Wu
Attorney, Agent, or Firm—Nilles & Nilles

[57] ABSTRACT

Compositions and methods for producing colored replicas are described. A method includes: combining a polymerizable varnish and a dye to form a composition, wherein the dye is substantially dissolved in the composition; and replicating a surface topography with the composition. The compositions and methods provide advantages in that surface topography is replicated in a color tinted polymer matrix with enhanced overall cost effectiveness.

57 Claims, 16 Drawing Sheets

METHOD OF MAKING COLORED REPLICAS AND COMPOSITIONS FOR USE THEREWITH

CROSS-REFERENCE TO RELATED APPLICATION

This application is a continuation-in-part under 35 U.S.C. §120 of U.S. Ser. No. 08/800,872, filed Feb. 14, 1997, now U.S. Pat. No. 5,922,238, the entire contents of which are hereby incorporated by reference.

BACKGROUND OF THE INVENTION

1. Field of the Invention

The present invention relates in general to the field of making laminated components. More particularly, the present invention relates to a method of making laminated optical components having embedded optical elements. Specifically, a preferred embodiment of the present invention relates to a method of making the collimating backlight of a liquid crystal display system by replicating a plurality of optical elements in a layer of material and then laminating the replication side of the layer to a substrate with an index of refraction matching material, thereby embedding the optical elements within the collimating backlight. The present invention thus relates to a method of making optical components of the type that can be termed lamination embedding.

2. Discussion of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Historically, it was known in the prior art to replicate structural features in various polymeric materials.[1] As is known to those skilled in the art, a master topography can be machined into a material, such as, for example aluminum or copper. Replicas can then be made from the master by pressing the master topography into a polymeric material. In the past, this replication process has been inefficient because the replicas were made individually. Thus, a previously recognized problem has been that large amounts of time are consumed in making a large number of replicas, resulting in a high per unit cost which did not decrease as the number of replicas made increased.

Needless to say, it is desirable to provide a method of mass producing replicas with higher efficiency. However, merely enhancing the efficiency of the replication step without considering any attendant increase in overall costs is not an adequate solution because the way in which the replication step is improved may involve more time, expense and/or energy than is saved due to improvements in the replication step.

For example, one unsatisfactory previous approach involves machining the master topography into an outer surface of a cylindrical unitary metal drum. The use of such a unitary metal drum might permit the replicas to be made continuously, thereby enhancing efficiency and quality. However, a disadvantage of this previously recognized approach is that such a metal drum is a single purpose tool. When there is no longer any demand for a particular replica, the metal drum cannot be adapted for another use because the master topography is an integral part of the drum itself.

Moreover, this previously recognized solution also has the significant disadvantage of high initial cost. The cost of machining the metal drum can easily be more than the savings incurred from the use of a continuous replication step, especially where a moderate number of replicas will be made, or where the replication features to be machined into the surface of the drum are numerous and/or very small. From a business point of view, the decision of whether or not to invest in such a unitary metal drum can be problematic where the individual orders in-hand for a particular type of replica do not justify the cost of machining a unitary metal drum. Therefore, what is needed is a method that replicates a surface topography with enhanced overall cost effectiveness, where the number of replicas to be made is, at best, uncertain.

The manufacture and sale of replicas is a competitive business. A preferred solution will be seen by the end-user as being cost effective. A solution is cost effective when it is seen by the end-user as compelling when compared with other potential uses that the end-user could make of limited resources.

Liquid crystal displays of the type hereunder consideration, sometimes called LCDs, are well-known to those skilled in the art.[2,3] An LCD can be illuminated from the back so that the LCD can be viewed under conditions of low ambient lighting. For example, a backlight that includes one or more fluorescent light bulbs can be located behind the LCD.

A previously recognized problem has been that the light from the backlight must be polarized in order for the LCD to function properly. One approach, in an attempt to solve this polarization problem, involves providing a polarizing sheet between the backlight and the LCD. However, a major disadvantage of this approach is that a large amount of the available light from the backlight is not transmitted through the polarizing sheet, thereby resulting in decreased brightness.

To address the decreased brightness disadvantage discussed above, one approach has been to provide a plurality of optical elements in the bottom surface of the backlight. The purpose of these optical elements is to condition the light from the backlight before it reaches the polarizing sheet. By providing these optical elements, less power is lost when the collimated light passes through the polarizing sheet and the brightness of the LCD is enhanced.

However, this approach has the significant disadvantage of relatively high cost. Specifically, the cost of providing the optical elements on the bottom surface of the backlight is too high. For example, injection molding such a backlight requires expensive tooling and several minutes of production time for each molding. Further, the cost of tooling is even higher where a large number of optical elements are to be formed on each backlight or where the size of each of the optical elements is small. Therefore, what is also needed is a method of mass producing optical elements in an LCD backlight with enhanced overall cost effectiveness. Heretofore the above-discussed requirements have not been fully met.

The below-referenced U.S. patents disclose embodiments that were at least in-part satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

U.S. Pat. No. 5,396,350 discloses a backlighting apparatus employing an array of microprisms. U.S. Pat. No. 5,390,276 discloses a backlighting assembly utilizing microprisms. U.S. Pat. No. 5,371,618 discloses a color liquid crystal display employing dual cells. U.S. Pat. No. 5,359,691 discloses a backlighting system with a multi-reflection light injection system. U.S. Pat. No. 5,056,892 discloses a totally internally reflecting thin flexible film.

SUMMARY AND OBJECTS OF THE INVENTION

By way of summary, an effect of the present invention is to make the collimating backlight of a liquid crystal display system by replicating a plurality of optical elements in a layer of material and then laminating the replication side of the layer of material to a substrate with an index of refraction matching material, thereby embedding the optical elements within the collimating backlight. The replication side can be coated with a reflective layer before lamination.

A primary object of the invention is to provide compositions for producing replicas of various surface topographies. It is another object of the invention to provide colored diffusers having reproducible transmission characteristics.

Another primary object of the invention is to provide an apparatus for producing replicas of a surface topography with enhanced overall cost effectiveness. It is another object of the invention is to provide an apparatus that is rugged and reliable, thereby decreasing down time and operating costs. It is yet another object of the invention is to provide an apparatus that has one or more of the characteristics discussed above but which is relatively simple to operate using a minimum of equipment and relatively simple to setup and operate using relatively low skilled workers.

In accordance with a first aspect of the invention, these objects are achieved by providing an apparatus comprising: a carrier sheet; a source of a resin; a coater for coating said carrier sheet with said resin; and a drum for replicating a topography in said resin. In one embodiment, said drum includes a plurality of submasters, each of said plurality of submasters having said topography.

Another object of the invention is to provide a method of producing replicas of optical elements that are to be embedded in an optical component. It is another object of the invention to provide a method that is predictable and reproducible, thereby decreasing variance and operating costs. It is yet another object of the invention to provide a method that has one or more of the characteristics discussed above but which is relatively simple to practice using relatively low skilled workers.

In accordance with a second aspect of the invention, these objects are achieved by providing a method comprising: providing a master surface topography with a plurality of optical elements; providing a plurality of submaster blanks, each of said plurality of submaster blanks having (a) a first submaster surface, and (b) a second submaster surface; pressing said master surface topography against said first submaster surface of each of said plurality of submaster blanks; replicating said master surface topography in said first submaster surface of each of said plurality of submaster blanks as a submaster surface topography; providing a drum with an external surface; connecting said second submaster surface of each of said plurality of said submaster blanks to said external surface of said drum; providing a resin layer having (a) a viscosity, (b) a first resin surface, and (c) a second resin surface; (1) pressing said first submaster surface of one of said plurality of submaster blanks against said first resin surface; (2) replicating said submaster surface topography of said one of said plurality of submaster blanks in said first resin surface of said resin layer as a replica surface topography, said replica surface topography including replicas of said plurality of optical elements; (3) releasing said first submaster surface of said one of said plurality of submaster blanks from said first resin surface; increasing said viscosity of said resin layer; cutting said resin layer to form an optical element layer that includes said replica surface topography; coating said replica surface topography with a layer; providing a substrate having a substrate refractive index; and connecting said layer to said substrate with an index matching material having a matching refractive index that is substantially equal to said substrate refractive index. One embodiment of the invention further comprises repeating continuously steps (1), (2) and (3).

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which.

DESCRIPTION OF THE PREFERRED EMBODIMENTS

The present invention and the various features and advantageous details thereof are explained more fully with reference to the nonlimiting embodiments described in detail in the following description.

1. System Overview

The above-mentioned requirements are mutually contradicting and cannot be satisfied simultaneously in the case of a machined cylindrical unitary metal drum. However, it is rendered possible to simultaneously satisfy these requirements to a certain extent by employing a drum that includes a plurality of submasters in consideration of the fact that the submasters can themselves be replicas.

2. Detailed Description of Preferred Embodiments

Figure 2:
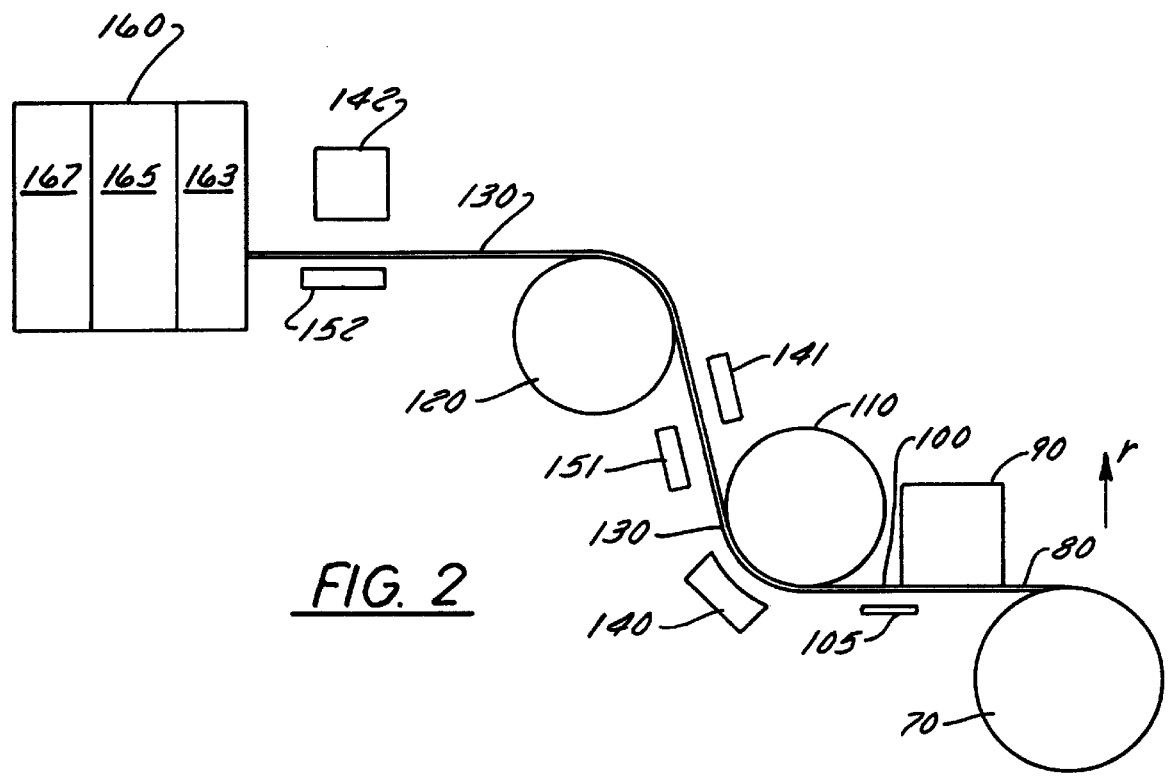
FIG. 2 illustrates a schematic elevational view of an apparatus for carrying out method step representing an embodiment of the invention.
Figure 3:
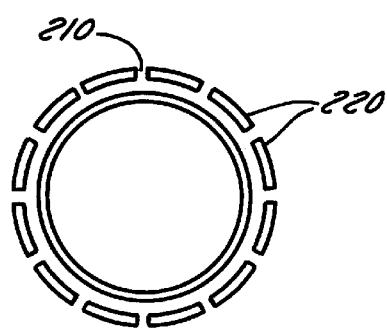
FIG. 3 illustrates a schematic elevation view of a first embodiment of a drum representing an embodiment of the invention.
Figure 4:
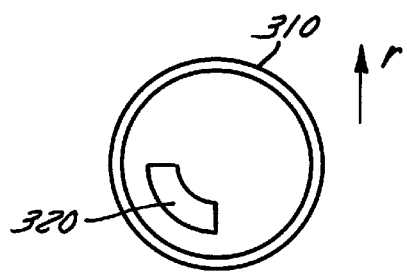
FIG. 4 illustrates a schematic elevation view of a second embodiment of a drum representing an embodiment of the invention.

Referring to the drawings, especially FIGS. 2–4, it can be seen that a surface topography can be replicated on a continuous basis using a drum that includes a plurality of submasters. Pursuant to the present invention, complex surface topographies that include a large number of very small features can be efficiently replicated and then embedded within an optical element.

Figure 1A:
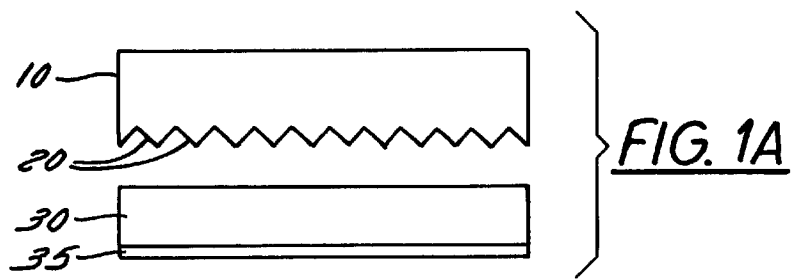
FIGS. 1A–1F illustrate a schematic sequence of method steps representing an embodiment of the invention.

Referring to FIG. 1A, submaster 10 includes a surface topography that defines a plurality of optical elements 20. Although submaster 10 can be metal, or an electroform plate replication, submaster 10 does not need to include any metal and can be made of any material that is capable of holding and transferring the surface topography, such as, for example, polymethylmethacrylate (PMMA), polycarbonate, mylar or polyurethane. In the case where the submaster 10 will be used for compression molding, it should be metal. In the case where it will be used for replication, the submaster 10 should be UV cured plastic.

To fabricate such a metal submaster, the first step can be to replicate a copper master in polycarbonate. Then a layer of silver nitrate can be deposited on the polycarbonate. Then a layer of nickel can be electroformed on the layer of silver nitrate. To remove the resulting submaster from the polycarbonate one can use solvent, or advantageously, heat the coated layers together with the polycarbonate and then physically pull the plastic and metal apart.

Resin layer 30 is located near but not initially touching submaster 10. Resin layer 30 can be any material capable of being impressed with the surface topography, and, with or without subsequent processing, holding the surface topography. For example, in an extrusion replication process, resin layer 30 can be a polycarbonate thermoplastic that is coated on carrier 35 as a continuous film. Carrier 35 can be a film of polyester or polycarbonate and can be any thickness. Resin layer 30 can be chilled after the surface topography is transferred to increase the viscosity of resin layer 30. Alternatively, in a printing replication process, resin layer 30 can include an acrylated aliphatic urethane blend coated on carrier 35 as a continuous film and then cured by exposure to ultraviolet radiation after the surface topography is transferred and before the submaster 10 is removed from resin layer 30.

It should be noted that the surface topography is represented in FIG. 1A as a periodic series of isosceles triangular prisms for improved clarity. Although the preferred embodiment shown in FIG. 1A includes the periodic series of isosceles triangular prisms, it is within the level of ordinary skill in the art after having knowledge of the invention disclosed herein to substitute any other type of surface topography. The depth of the surface topography can be any depth that can be stabilized in the resin layer, preferably from approximately 0.2 $\mu$m to approximately 200 $\mu$m, more preferably from approximately 1 $\mu$m to approximately 100 $\mu$m. The aspect ratio of individual features that optionally compose an optical element can be any aspect ratio that can be stabilized in the resin layer. The width ratio of adjacent individual features can be any width ratio that can be stabilized in the resin layer, preferably at least approximately 2. The width of the individual optical elements can be any width that can be stabilized in the resin layer, preferably at least approximately 0.1 $\mu$m, more preferably at least approximately 10 $\mu$m. Thus, the depth to width ratio can vary from approximately 0.02:1 to approximately 2000:1, preferably from approximately 2:1 to approximately 20:1. The width of any bottom plateau that optionally composes an optical element can be any width that can be stabilized in the resin layer, preferably at least approximately 0.1 $\mu$m, more preferably at least approximately 10 $\mu$m.

While the individual features shown in FIG. 1A are the flat sides of isosceles prisms, the individual features can be curved. For example, the individual features can be convex with respect to the resin layer 30, thereby creating a concave replica feature.

Figure 1B:
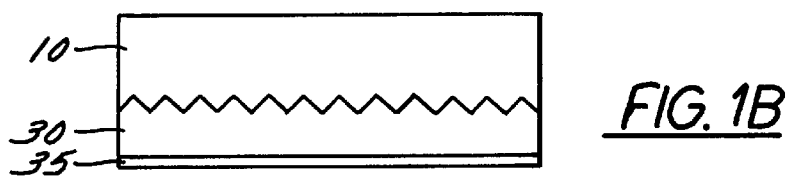

Referring now to FIG. 1B, the next step in the sequence of procedures is to contact resin layer 30 with submaster 10. When submaster 10 is in full contact with resin layer 30, the plurality of optical elements 20 is expressed in resin 30 as a replica. Submaster 10 should be in contact with resin 30 for a period of time sufficient to transfer the surface topography. Assuming that resin layer 30 includes a thermoplastic, it can be advantageous to cool resin layer 30 while it is in contact with submaster 10 to stabilize the surface topography. Similarly, assuming that resin layer 30 includes an ultraviolet curing polymer, it can be advantageous to expose resin layer 30 to UV radiation while it is in contact with submaster 10 to stabilize the surface topography.

Figure 1C:
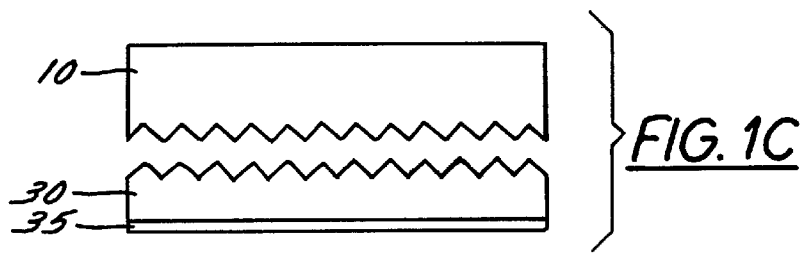

Referring now to FIG. 1C, the next step in the sequence of procedures is to separate submaster 10 from resin layer 30 so as to obtain the release of the submaster surface topography from the replicated surface topography. After the release, resin layer 30 can be cooled and/or cured to stabilize the surface topography.

Figure 1D:
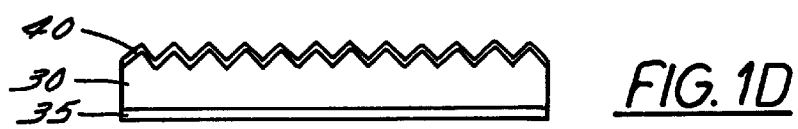

Referring now to FIG. 1D, the next step in the sequence of procedures is to coat the replica surface topography. Coating 40 can be a reflective, or merely refractive, coating. If coating 40 is a reflective coating, then it is preferred that coating 40 comprise at least one element selected from the group consisting of aluminum and silver. However, the reflective coating material can contain any components so long as the coating as a whole retains its reflective character. Coating 40 can be a chemical vapor deposited thin film or a sputtered thin film.

Figure 1E:
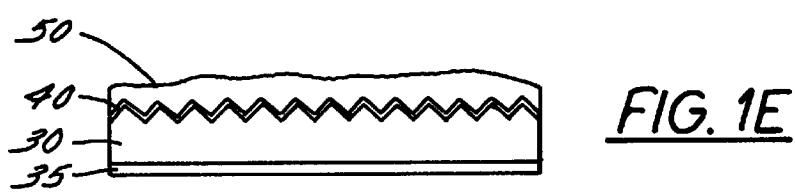

Referring now to FIG. 1E, the next step in the sequence of procedures is to deposit an index matching fluid 50 on top of coating 40. Index matching fluid 50 can be any material that is at least partially transmissive. For example, index matching fluid 50 can be an acrylic based epoxy for the purpose of providing clarity. Index matching fluid 50 can be a mixture of two or more components. It is preferred that the index matching fluid 50 be a UV curable fluid.

Figure 1F:
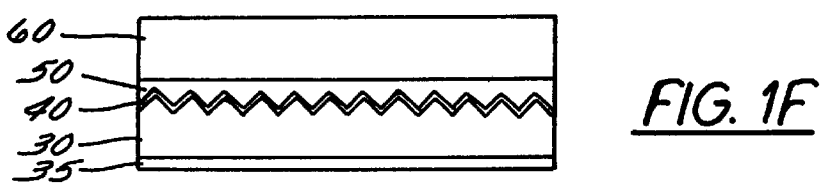

Referring now to FIG. 1F, the next step in the sequence of procedures is to contact index matching fluid 50 with substrate 60. Index matching fluid 50 is thereby sandwiched between substrate 60 and coating 40. It is preferred that if index matching fluid 50 is a UV curable composition, then the curing be delayed until after substrate 60 is in contact with index matching fluid 50.

Alternatively, the index matching fluid 50 can be coated on substrate 60. In this alternative embodiment, the index matching fluid would then be contacted with coating 40. The elements shown in FIGS. 1A–1F are not necessarily drawn to scale.

It can be seen from FIG. 1F that the effect of the invention is to replicate and embed a surface topography in an optical element. FIG. 1F demonstrates substantially improved results that are unexpected. Specifically, the result of transferring, coating and embedding demonstrates the unexpected advantageous result that when a surface topography is replicated and then coated with a reflective coating, a reflective topography can be accurately and precisely geometrically located with respect to the balance of an optical component or device (i.e., substrate 60). Further, by embedding the coating, the reflective surface is unexpectedly advantageously efficiently optically coupled to the balance of the optical component or device. Furthermore, by embedding the coating, the reflective surface is protected. Therefore, this inventive choice of design provides energetic and economic efficiencies.

Referring now to FIG. 2, an apparatus for carrying out the method of the presently claimed invention is depicted. Supply of carrier 70 can be a large roll of sheet material. Carrier 80 is drawn from supply of carrier 70. Carrier 80 can be any suitable substrate that is capable of providing a sufficient backing for the replication process. For example, carrier 80 can be polyester, polycarbonate, polyvinylchloride, or even paper.

Coater 90 can be located near and above carrier 80. Coater 90 deposits a coating 100 on carrier 80. Coater 90 can be a tape casting unit with a doctor blade or any other device capable of depositing a suitable layer of coating 100. Coating 100 can include a thermoplastic material and/or a photopolymerizable material.

As carrier 80 is drawn downstream, coating 100 is pressed against drum 110. Drum 110 includes a surface topography that is transferred to coating 100. Drum 110 can include a heater and/or a chiller so as to transfer thermal energy to or away from carrier 80 and coating 100. Drum 110 can be transparent and include an ultraviolet light source.

If coating 100 includes a photopolymerizable material, ultraviolet light source 140 is located near drum 110 and opposite coating 100 and carrier 80. The ultraviolet light source should be capable of causing coating 100 to cure, at least partially, while coating 100 is still in contact with the surface topography of drum 110.

If coating 100 includes a thermoplastic material, heater 105 is located near drum 110 and opposite coating 100 and carrier. Heater 105 should be capable of supplying sufficient thermal energy to coating 100 before coating 100 contacts drum 110 such that the viscosity of coating 100 is suitable for replication of the surface topography of drum 110.

As carrier 80 is drawn further downstream, coating 100 is released from, and pulled away from drum 110. The pressing processes can be described as rolling because carrier 80 carries coating 100 away from drum 110 so that coating 100 does not drag. Coating 100 and its carrier 80 emerges from drum 110 as a replicated structure 130.

Replicated structure 130 can then pass under device 141. Device 141 can be an ultraviolet light source, a chiller or analogous device depending on whether the replication process is one of UV cured printing or thermoplastic extrusion, respectively. Device 141 can be serially duplicated, or entirely omitted. As a given section of replicated structure 130 passes beneath device 141, the carrier 80 side of replicated structure 130 can simultaneously pass above device 151. Device 151 can be an ultraviolet light source, a chiller or analogous device depending on whether the replication process is one of UV cured printing or thermoplastic extrusion, respectively. The use of device 141 and/or device 151 can ensure that coating 100 is fully cured and/or improve the adhesion of coating 100 to carrier 80.

As carrier 80 is pulled further downstream, carrier 80 is run up and over traction roller 120. Although traction roller 120 is depicted in FIG. 2 as having the same diameter as drum 110, traction roller 120 can have any relative diameter. Traction roller 120 can include a heater and/or a chiller. Traction roller 120 can be transparent and include an ultraviolet light source. Although traction roller 120 is depicted in FIG. 2 as being positioned relative to drum 110 so as to pull replicated structure up and away from the centerline of drum 110, traction roller 120 can be located so as to pull the replicated structure straight up, or even up and toward the centerline of drum 110.

The post rolling processing can be continued by passing replicated structure 130 beneath device 142. Device 142 can be the same type of device as device 141 or a different type of device, such as, for example, a surface conditioner for coating 100. Device 142 can be serially duplicated, or entirely omitted. As a given section of replicated structure 130 passes beneath device 142, the carrier 80 side of replicated structure 130 simultaneously passes above device 152. Device 152 can be the same type of device as device 151 or a different type of device, such as, for example, a delaminating structure for separating carrier 80 from coating 100. Of course, device 152 can be serially duplicated, or entirely omitted.

Replicated structure 130 then passes to subsequent processing assembly 160. Assembly 160 can include further viscosity changing devices 163. Assembly 160 can include a coating system 165 such as, for example, a chemical vapor deposition (CVD) reactor or a sputtering chamber for deposition of coating 40. Such a coating system can be a continuous differentially pumped coating system. Assembly 160 can include a dynamic shearing mechanism 167 that cuts replicated structure 130 perpendicular to its drawn axis, thereby slicing sheets of replicated structures 130. Assembly 160 can also include pick and place robots that move sheared segments of replicated structure 130 to different positions for addition of the index matching fluid 50. Assembly 160 can also include pick and place robots that join sheared segments of replicated structure 130 with substrate 60. (It should be noted that the assembly 160 is represented in FIG. 2 schematically for improved clarity.) Although the preferred embodiment shown in FIG. 2 includes the shearing mechanism, it is within the level of ordinary skill in the art after having knowledge of the invention disclosed herein to provide any type of post processing device as part of assembly 160.

Referring now to FIG. 3, a drum 210 with a plurality of submasters 220 is depicted. Drum 210 in FIG. 3 is analogous to drum 110 in FIG. 2. A plurality of submasters 220 can be attached to the exterior surface of drum 210 with a pressure sensitive adhesive. Drum 210 can be transparent and an ultraviolet light source can be located therein. (It should be noted that the submasters 220 represented in FIG. 3 as twelve relatively short thick strips are not drawn to scale and are depicted schematically for improved clarity.) Although the preferred embodiment shown in FIG. 3 includes twelve submasters, it is within the level of ordinary skill in the art after having knowledge of the invention disclosed herein to attach any number of submasters to the exterior surface of drum 210.

Referring now to FIG. 4, a drum 310 is shown with its surface topography provided directly on the exterior surface thereof. Drum 310 in FIG. 4 is analogous to drum 210 in FIG. 3 and drum 110 in FIG. 2. Drum 310 can be made of any transparent material, such as, for example, polymethyl-methacrylate (i.e., PLEXIGLASS™). An ultraviolet light source 320 is shown located within the interior of drum 310. Ultraviolet light source 320 can be located angularly with respect to the axis of drum 310 so as to provide ultraviolet radiation to a portion or all of the exterior surface of drum 310. (It should be noted that the ultraviolet light source is represented in FIG. 4 as a schematic for improved clarity.) Although the preferred embodiment shown in FIG. 4 includes an ultraviolet light source that directs ultraviolet light toward and through the drum 310 directly after the rolling operation, along an arc of the drum beginning at approximately π radian and ending at approximately 2π/3 radian, it is within the level of ordinary skill in the art after having knowledge of the invention disclosed herein to provide any type of light source directing any type of light toward and through any portion, or all, of the drum 310.

While not being limited to any particular theory, it is believed that the replicated topography changes during the removal of the submaster from the resin. This relationship may be due to adhesion and/or surface tension on the resin. For example, replicated features of a concave nature are believed to change into features that are more nearly flat (or convex). By using an ultraviolet curing resin together with a drum that is transparent in the ultraviolet spectrum, the interior of which is equipped with an ultraviolet light source, it is believed that the topography of the resin can be stabilized before and/or shortly after the submaster topography is removed from the resin.

Such a transparent drum can have the master topography directly replicated in its exterior surface. Alternatively, such a transparent drum can include a plurality of transparent submasters.

The disclosed embodiments show a drum as the structure for performing the function of transferring the surface topography, but the structure for transferring the surface topography can be any other structure capable of performing the function of transferring the topography, including, by way of example a continuous belt, a disc or even a torus.

Figure 5A:
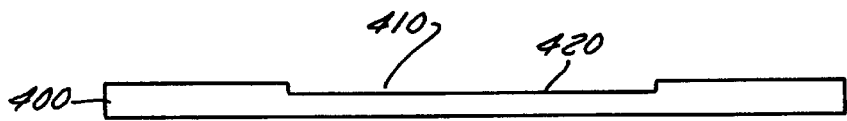
FIGS. 5A–5H illustrate a schematic sequence of steps for a method of replication representing an embodiment of the invention.
Figure 5B:
Figure 5C:
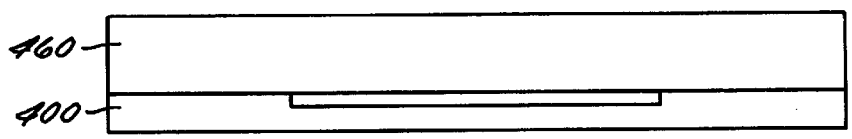
Figure 5D:
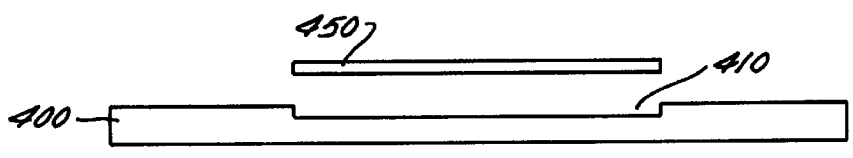
Figure 5E:
Figure 5F:
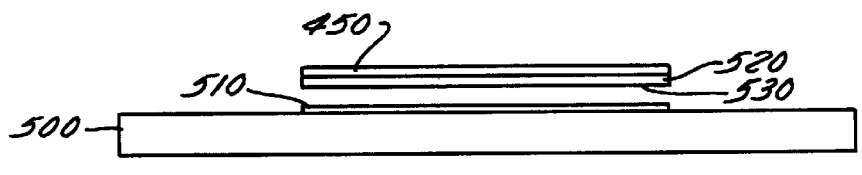
Figure 5G:
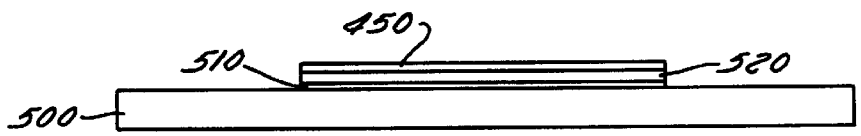
Figure 5H:
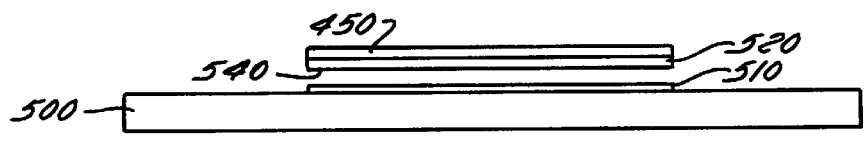

Referring now to FIGS. 5A–5H, a schematic sequence of steps for forming a double sided optical component by compression molding followed by replication is shown. Referring to FIG. 5A, a compression mold 400 having a mold space 410 with a first topography 420 is provided. Referring to FIG. 5B, the mold space 410 is charged with a first resin 450 having a first viscosity. The first resin 450 can be a thermoplastic or a thermoset. Referring to FIG. 5C, pressure is applied to the first resin 450 with a pressing tool 460 so as to fill the first topography 420 with the first resin 450. Still referring to FIG. 5C, the viscosity of the first resin is then increased by the application of energy such as ultraviolet radiation, if the first resin 450 is a thermoset, or by cooling, if the first resin 450 is a thermoplastic. Referring to FIG. 5D, the first resin 450 is removed from the mold space 410. Referring to FIG. 5E, a submaster 500 having a second topography 510 is provided. Referring to FIG. 5F, the first resin 450 is coated with a layer of a second resin 520 having a second viscosity and a surface 530. The second resin 520 can be the same as, or different from, the first resin 450. Referring to FIG. 5G, the second topography is pressed against the surface 530 of the second resin 520 so as to replicate the second topography 510 in the surface 530 of the second resin as a replica surface 540. Still referring to FIG. 5G, the viscosity of the second resin is then increased by the application of energy, if the second resin 520 is a thermoset, or by cooling, if the second resin 520 is a thermoplastic. Referring to FIG. 5H, the replica surface 540 is released from the second topography 510. Thus, a two sided replica can be fabricated by combining the steps shown in FIGS. 5A–5D with the steps shown in FIGS. 5E–5H. Alternatively, the two sided replica can be fabricated with a sequential compression molding process or with a compression molding process that forms both sides at once by using a pressing tool that carries a second topography.

Figure 6A:
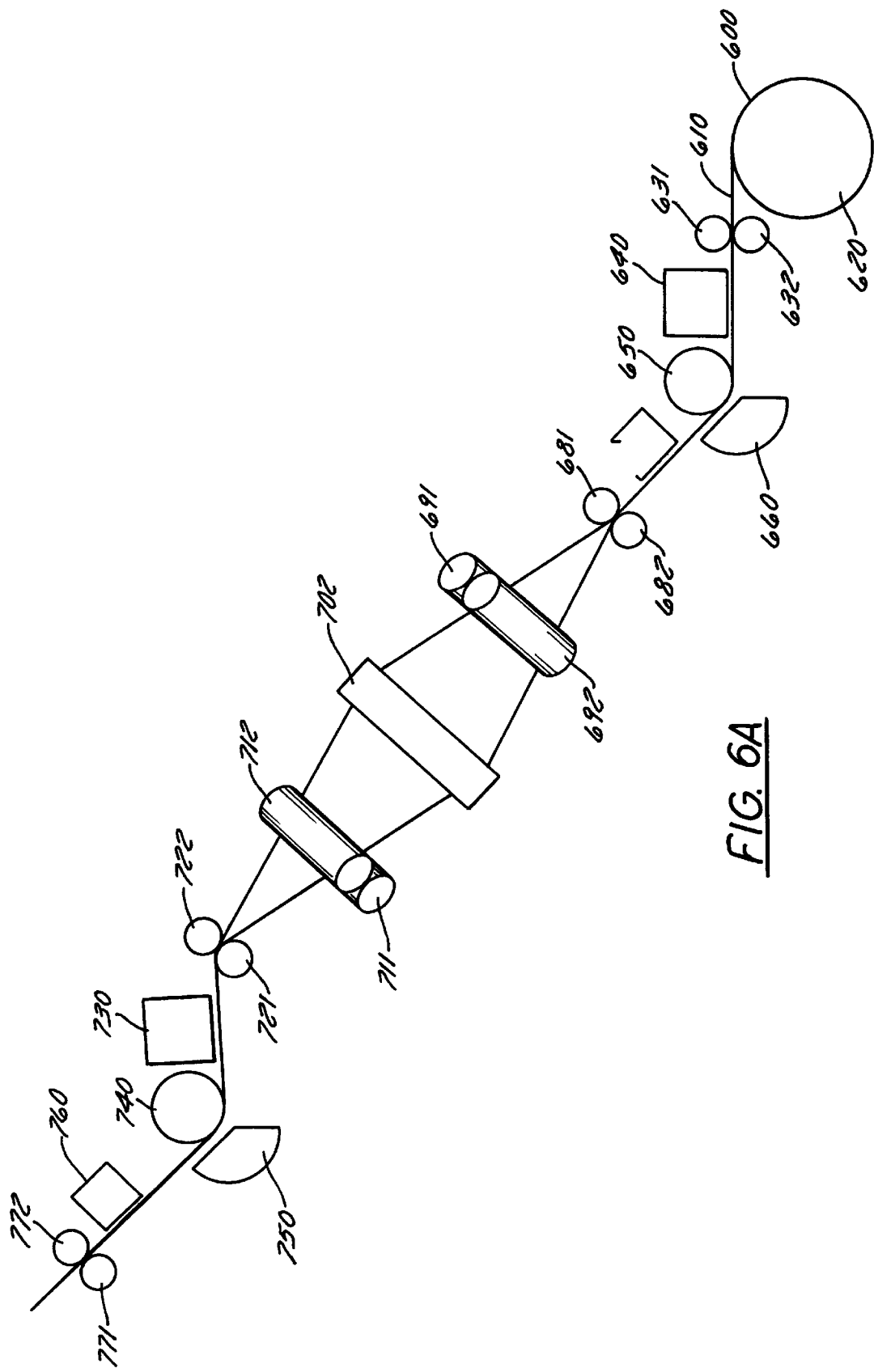
FIG. 6A illustrates a schematic elevation view of an apparatus for carrying out another method of replication representing an embodiment of the invention.

Referring now to FIG. 6A, a schematic elevation view of an apparatus for carrying out a sequential two-sided replication is shown. A supply 600 of a carrier web 610 is provided by a roll 620. The carrier web 610 has a first side and a second side. The carrier web 610 is drawn between traction rollers 631 and 632. The top (first side) of carrier web 610 is coated with a first resin having a first viscosity by coater 640. A first submaster having a first topography is provided on the surface of drum 650. The first topography is pressed against the first resin as the carrier web 610 is drawn over drum 650, thereby replicating the first topography in the first resin as a first replica surface. The viscosity of the first resin is increased by hardener 660 while the first resin is still in contact with the first topography. Hardener 660 can be a radiation source such as an ultraviolet light, if the first resin is a thermoset, or a cooling device such as a convection chiller, if the first resin is a thermoplastic. Drum 650 can also incorporate a chiller and/or a radiation source, if drum 650 is translucent. The first replica surface is then released from the first topography. Postprocessor 670 can be an additional hardener or a surface treatment apparatus such as, for example, a metalization coater.

Still referring to FIG. 6A, the carrier web 610 which now bears the first replica surface is then drawn between traction rollers 681 and 682. The placement of traction rollers 681 and 682 ensures that the first resin is in contact with the first topography for a sufficient period of time for the replication to take place. The carrier web is then drawn between and rotated along its longitudinal axis by traction rollers 691 and 692. The carrier web is then drawn between and further rotated along its longitudinal axis by traction roller 702 and another traction roller (not shown). The carrier web is then drawn between and yet further rotated along its longitudinal axis by traction rollers 711 and 712. The carrier web is then drawn between and still further rotated along its longitudinal axis by traction rollers 721 and 722. In this way, the carrier web is turned over so that the subsequent coating and replication on the second side of the carrier web 610 can take place in a similar orientation to the previous coating and replication on the first side of the carrier web 610, with regard to gravity. This subprocess of turning the carrier web 610 over is optional and can be omitted, especially if the viscosity of the resin(s) as coated is high enough to resist deformation.

Still referring to FIG. 6A, the second side of carrier web 610 is coated with a second resin having a second viscosity by coater 730. The second resin can be the same as, or different from, the first resin. A second submaster having a second topography is provided on the surface of drum 740. The second topography is pressed against the first resin as the carrier web 610 is drawn over drum 740, thereby replicating the second topography in the second resin as a second replica surface. The viscosity of the second resin is increased by hardener 750 while the second resin is still in contact with the second topography. Hardener 750 can be a radiation source such as an ultraviolet light, if the second resin is a thermoset, or cooling device such as a convection chiller, if the second resin is a thermoplastic. Drum 740 can also incorporate a chiller and/or a radiation source, if drum 740 is translucent. The second replica surface is then released from the second topography. Postprocessor 760 can be an additional hardener or a surface treatment apparatus such as, for example, a metalization coater. Finally, carrier web 610 is drawn between traction rollers 771 and 772. Thus, a two sided replica can be fabricated by a sequential continuous process.

Figure 6B:
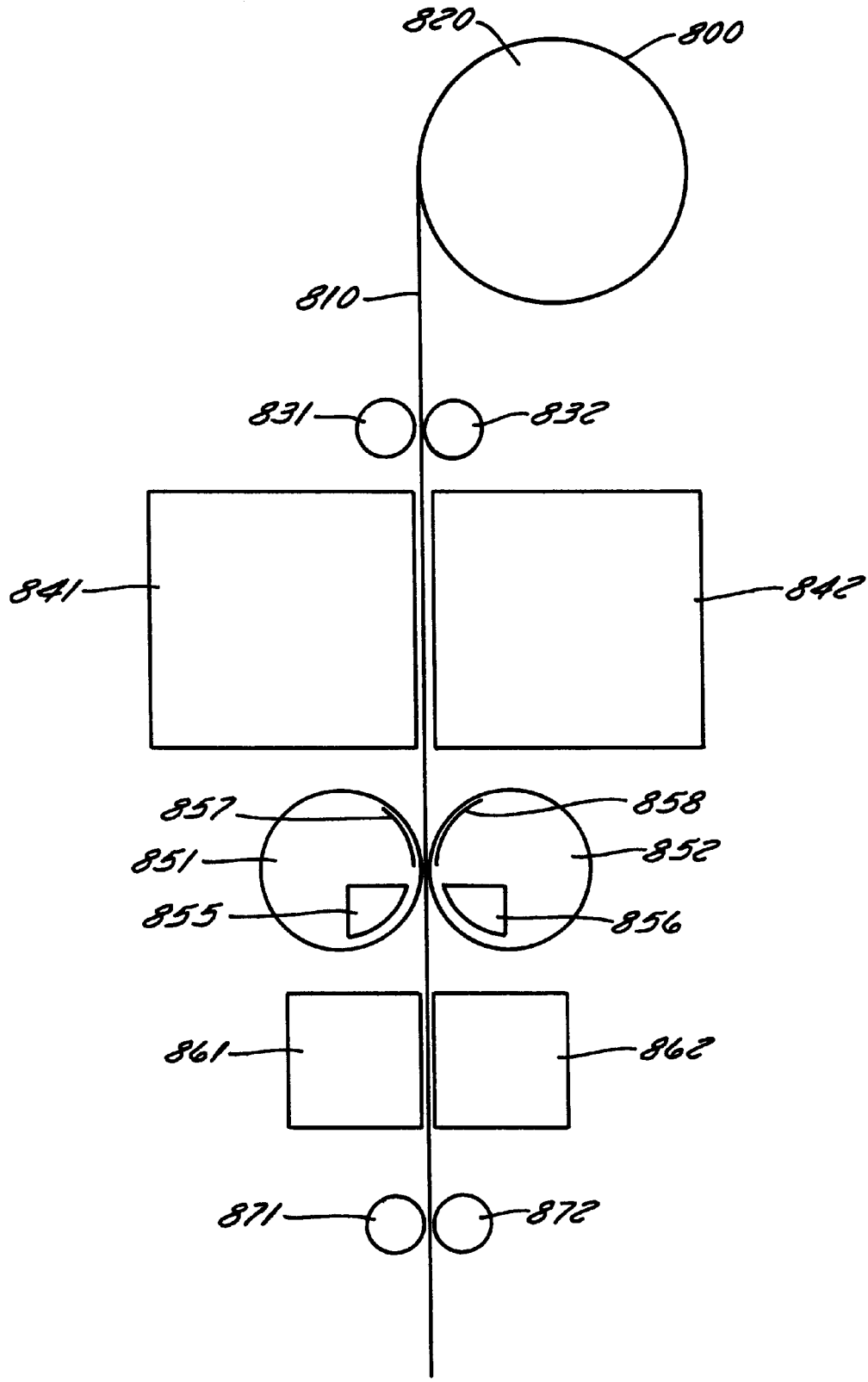
FIG. 6B illustrates a schematic elevation view of an apparatus for carrying out a yet another method of replication representing an embodiment of the invention.

Referring now to FIG. 6B, a schematic elevation view of an apparatus for carrying out a simultaneous two-sided replication is shown. A supply 800 of a carrier web 810 is provided by a roll 820. The carrier web 810 has a first side and a second side. The carrier web 810 is drawn between traction rollers 831 and 832. Although the carrier web 810 can be drawn off roll 820 in any direction, in a preferred embodiment, the carrier web is drawn off in a direction parallel to the gravitational field so that the subsequent dual side coating and replication can take place in the same orientation with the carrier web, with regard to gravity. In a particularly preferred embodiment, the carrier web is drawn approximately vertically downward.

Still referring to FIG. 6B, the first side of carrier web 810 is coated with a first resin having a first viscosity by coater 841. Substantially simultaneously, the second side of carrier web 810 can be coated with a second resin having a second viscosity by coater 842. Although coater 841 is depicted as being closer to carrier web 810 than is coater 842, the distance between the coaters and the carrier web 810 can be equal. In a preferred embodiment, the distance between the coaters and the carrier web 810 is completely independently adjustable so that maximum configuration flexibility is provided. Independent adjustability of the coaters can be particularly advantageous when the first and second resins are different and/or the first and second topographies are different. A first submaster having a first topography is provided on the surface of drum 851. A second submaster having a second topography is provided on the surface of drum 852. The first topography is pressed against the first resin as the carrier web 810 is drawn over drum 851, thereby replicating the first topography in the first resin as a first replica surface. Substantially simultaneously, the second topography is pressed against the second resin as the carrier web 810 is drawn over drum 852, thereby replicating the second topography in the second resin as a second replica surface.

The viscosity of the first resin is increased by hardener 855 while the first resin is still in contact with the first topography. Hardener 855 can be a radiation source such as an ultraviolet light, if the first resin is a thermoset, or a cooling device such as a convection chiller, if the first resin is a thermoplastic. The hardener 855 can be located inside drum 851, if drum 851 is translucent. In this case, the drum 851 can also be provided with a shield 857 so as to prevent the first resin from becoming hardened before the replication occurs. Shield 857 can be an opaque screen or a crossed polarizer. Substantially simultaneously, the viscosity of the second resin can be increased by hardener 856 while the second resin is still in contact with the second topography. Hardener 856 can be a radiation source such as an ultraviolet light, if the second resin is a thermoset, or a cooling device such as a convection chiller, if the second resin is a thermoplastic. The hardener 856 can be located inside drum 852, if drum 852 is translucent. In this case, the drum 852 can also be provided with a shield 858 so as to prevent the second resin from becoming hardened before the replication occurs. Shield 858 can be an opaque screen or a crossed polarizer.

Still referring to FIG. 6B, the first replica surface is then released from the first topography. Substantially simultaneously, the second replica surface is released from the second topography. Postprocessor 861 can be an additional hardener or a surface treatment apparatus such as, for example, a metalization coater. Similarly, postprocessor 862 can be an additional hardener or a surface treatment apparatus such as, for example, a metalization coater. Although the distance between post processor 861 and carrier web 810 is depicted as being less than the distance between post processor 862 and carrier web 810, these distances can be identical. In a preferred embodiment, the distance between the coaters and the carrier web is completely independently adjustable. Such independent adjustability can provide an advantage when the post processing to be conducted to the first and second resins differs. The carrier web 810 is then drawn off between traction rollers 871 and 872.

The particular manufacturing process used for replicating the surface topography should be reliable and predictable. Conveniently, the replication of the present invention can be carried out by using any impressing method. It is preferred that the process be pressing. For the manufacturing operation, it is moreover an advantage to employ a rolling method.

However, the particular manufacturing process is not essential to the present invention as long as it provides the described transformation. Normally the manufacturers of this product will select the manufacturing process as a matter of design choice based upon tooling and energy requirements, in view of the expected application requirements of the final product and the demands of the overall manufacturing process.

There are a large number of compositions that can be used to prepare submasters and/or finished products (i.e., replicas), according to the invention. Functionally, these compositions can be categorized as submaster compositions or replica (work piece) compositions. From a performance perspective, each of these categories can be further subdivided based on the depth of the topography that is to be rendered.

A preferred embodiment of a submaster composition for a large scale topography, such as, for example, a prism array includes: (1) a mixture including an acrylated aliphatic urethane oligomer/monomer blend and a tripropylene glycol diacrylate; (2) an isobornyl acrylate; (3) an ultraviolet polymerizing varnish; (4) a surfactant; and (5) a photoinitiator. The mixture can be Ebecryl 4883 which is available from the UCB Chemicals Corp of Smyrna, Ga. and compose approximately 43 wt. % of the submaster composition. The isobornyl acrylate can be 2-Propenoic acid, 1,7,7,-trimethylbicyclo[2.2.1]hept-2-yl (i.e., CAS 5888-33-5, aka IBOA Monomer which is available from the UCB Chemicals Corp. of Smyrna, Ga.), and compose approximately 22 wt. % of the submaster composition. The wt. % combination of the mixture and the isobornyl acrylate can be critical to achieving unexpectedly good results such as geometrical stability of the replicated topography despite a large dimensional scale of replicated features. The ultraviolet polymerizing varnish can be a flexo overprint varnish such as a mixture of a fluoro alkyl ester and an acrylated epoxy, for example, 25-UVF-1 which is available from the EPIC Printing Ink Corporation of Pomona, Calif. and compose approximately 27 wt. % of the submaster composition. The surfactant can be a SILWET surfactant such as, for example, polyalkylene oxide-modified polydimethylsiloxane (i.e., CAS 68938-54-5, aka L7602) and compose approximately 7 wt. % of the submaster composition. The wt. % combination of the ultraviolet polymerizing varnish and the surfactant can be critical to achieving unexpectedly good results such as resistance to yellowing. The photoinitiator can be 2-Hydroxy-2-methyl-1-phenyl-propan-1-one (aka Darocur 1173 which is available from the UCB Chemicals Corp.) and compose from approximately 0.5 wt. % to approximately 3 wt. %, preferably approximately 1 wt. %, of the submaster composition. Too much photoinitiator can cause cracking.

A preferred embodiment of a replica (work piece, or shippable product) composition for a large scale topography, such as, for example, a prism array includes: (1) a mixture including an acrylated aliphatic urethane oligomer/monomer blend and a tripropylene glycol diacrylate; (2) an isobornyl acrylate; (3) a β-Carboxyethyl acrylate; (4) a photoinitiator; and (5) an N-vinyl-2-pyrrolidone. The mixture can be Ebecryl 4883 and compose approximately 62 wt. % of the replica composition. The isobornyl acrylate can be 2-Propenoic acid, 1,7,7,-trimethylbicyclo[2.2.1]hept-2-yl and compose approximately 14 wt. % of the replica composition. The wt. % combination of the mixture and the isobornyl acrylate can be critical to achieving unexpectedly good results such as stability of the replicated topography despite a large dimensional scale. The β-Carboxyethyl acrylate can be 2-Propenoic acid, 2-carboxyethyl ester (i.e., CAS 24615-84-7 which is available from the UCB Chemicals Corp.) and compose from approximately 12 wt. % to approximately 25 wt. %, preferably approximately 18 wt. % of the replica composition. The wt. % of the β-Carboxyethyl acrylate can be critical to achieving unexpectedly good results such as maximum adhesion with minimum yellowing. Maximum adhesion can provide a copy protection feature that makes it more difficult to obtain a copy of the replica from the replica. The photoinitiator can be 2-Hydroxy-2-methyl-1-phenyl-propan-1-one and compose from approximately 0.5 wt. % to approximately 3 wt. %, preferably approximately 1 wt. %, of the replica composition. The N-vinyl-2-pyrrolidone can compose approximately 5 wt. % of the replica composition. The wt. % of the N-vinyl-2-pyrrolidone can be critical to achieving unexpectedly good results such as enhanced adhesion to a polyester carrier web so as to inhibit delamination.

A preferred embodiment of a submaster composition for a small scale topography, such as, for example, a surface diffuser includes: an ultraviolet polymerizing varnish and a surfactant. The ultraviolet polymerizing varnish can be a flexo overprint varnish, such as a mixture of a fluoro alkyl ester and an acrylated epoxy (e.g., 25-UVF-1) and compose from approximately 93 wt. % to approximately 96 wt. %, preferably approximately 95 wt. %, of the submaster composition. The surfactant can be a polyalkylene oxide-modified polydimethylsiloxane such as L7602 and compose from approximately 4 wt. % to approximately 7 wt. %, preferably approximately 5 wt. %, of the submaster composition. Using a silicone containing surfactant can be critical to achieving unexpectedly good results because the silicone floats while curing the submaster, thereby providing a surface segregation that facilitates the release of a replica from the submaster, especially for the replication of high aspect ratio replicas.

A preferred embodiment of a replica (shippable product) composition for a small scale topography, such as, for example, a surface diffuser is GAFGARD 233 which is a mixture of pentaerythritol triacrylate (PETA) and vinylpyrrolidone that is available from the GAF Corporation of Wayne, N.J. Another preferred embodiment of a replica composition for a small scale topography, such as, for example, a surface diffuser is 119511 EPIC which is available from the EPIC Printing Ink Corporation of Pomona, Calif.

The particular material used for the resin layer should be capable of stabilizing a high resolution surface topography. Conveniently, the resin layer of the present invention can be made of any plastic material. It is preferred that the material be an ultraviolet curing polymer resin. For the manufacturing operation, it is moreover an advantage to employ a polymethylmethacrylate material.

However, the particular material selected is not essential to the present invention, so long as it provides the described function. Normally, the manufacturers of this product will select the best commercially available material as a matter of design choice based upon the economics of cost and availability, in view of the expected application requirements of the final product and the demands of the overall manufacturing process.

Preferred embodiments of the present invention can be identified one at a time by testing for the presence of accurate and precise replication. The test for the presence of accurate and precise replication can be carried out without undue experimentation by the use of simple and conventional profile metering instrumentation. Among the other ways in which to seek embodiments having the attribute of accurate and precise replication guidance toward the next preferred embodiment can be based on the presence of easy, clean and complete submaster release.

Colored Diffusers

Where a final product having tinted transmission characteristics is desired, the need for a separate color filter can be obviated by incorporating a dye into the polymeric composition from which the product is made. The dye is advantageously mixed into the polymer composition before it is used in the replication process. The choice of dyes is determined foremost by the need for compatibility between the dye and the material from which the product is made. The replication procedures described above can be followed except that when the epoxy is mixed, the dye is added in a concentration of from approximately 0.1% to approximately 25% by weight. After adding the dye to the epoxy, it is advantageous to mix the resulting composition well. Stirring and/or ultrasonic frequency agitation can be efficient for this purpose. Also, heating to lower the viscosity can enhance the mixing process. In the case where the composition is heated during mixing, a preferred range of mixing temperature is from approximately 30° C. to approximately 55° C. In any event, it is important that the mixing temperature should be below the decomposition temperature of the dye. After heating and mixing, the composition can be cooled to room temperature in order to filter out undissolved dye. After filtering, the resulting mixture should appear homogenous and not contain any granules. If there are any bubbles in the mixture, the mixture can be centrifuged before utilization in the replication procedure. All of the other ingredients of the submaster compositions described above can remain as before and need not be affected by the use of the dye in the replica work piece composition. The use of a dye is especially useful for use with RGB color filter dyes. There are a large number of dyes that can be combined with the polymeric compositions discussed above. Possible dyes, many of which are suitable, include NEO ZAPON 975, cupric sulfate, MORDANT ORANGE 10, MEROCYANINE 540, 2,3 naphtalocyanine, ammonium cerium nitrate, METHYL RED, 7,7,8,8-tetracyano quinodimethane, PHYNOL RED, copper phtalocyanine, SUDAN IV, PONCEAVE S, METHYL ORANGE, MORDANT BROWN, AMARANTH, METHYLEN BLUE, ROSE BENGAL, 29H,31H-phathalocyanic, JANUS GREEN B, ZAPON RED 471, and ZAPON RED 335.

EXAMPLES

Specific embodiments of the present invention will now be further described by the following, non-limiting examples which will serve to illustrate in some detail various features of significance. The examples are intended merely to facilitate an understanding of ways in which the present invention may be practiced and to further enable those of skill in the art to practice the present invention. Accordingly, the examples should not be construed as limiting the scope of the present invention.

The present invention offers better transmission characteristics such as brightness, brightness uniformity, and elimination of light source artifacts for displays and the like by following two approaches:

The first is by depositing, coating and/or casting a colored epoxy formulation comprising a light shaping diffuser submaster of desired angle (such as 30° or any other angle) which offers controlled scattering on a transparent substrate. In this approach, a dye may be mixed in the epoxy directly and epoxy liquid is rendered homogeneous before casting on the transparent substrate. As indicated above, the substrate may be transparent and can be glass, and/or plastic such as polycarbonate, PMMA, PET, Mylar, TPX, polystyrene or any such plastic substrate that is transparent to visible light.

The second is by laminating or otherwise attaching a diffuser of any desired angularity on a colored plastic such as red and/or green GE Lexan or other plastics as well as other colors such as yellow, orange, violet, purple etc. In this approach, the colored plastic acts as a color filter, and the diffuser diffuses the light, creates brightness uniformity and controls scattering or light shaping thus resulting in brighter and more uniform displays (e.g., exit signs). The diffuser may be laminated directly on the GE Lexan plastic or attached thereon with a pressure sensitive adhesive layer. Here the dye is not mixed with epoxy but is in the substrate itself.

Three different types of substrates in the display were tested. The first was a conventional exit display having a standard substrate of 30 mil plastic silkscreened in red. The second was a substrate of 30 mil red plastic (GE Lexan) sheet having a diffuser made in clear epoxy laminated thereto. The third was a substrate of 30 mil. clear plastic (GE Lexan) sheet having a red dyed epoxy replicated thereon. In the second and third types, the epoxy varnish was held constant (GAFGARD 233) and was cured for approximately 9 seconds with a UV source (Dymas PC-2 @ 0.017 W/Cm$^2$) and a substrate of 10 mil thick PET polymer was used.

Figure 7B:
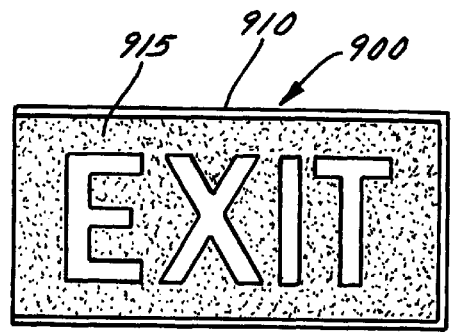
FIGS. 7A–7C illustrate schematic views of an emergency "EXIT" sign and test setup involving the sign which demonstrate performance characteristics of a colored diffuser representing an embodiment of the invention.
Figure 7A:
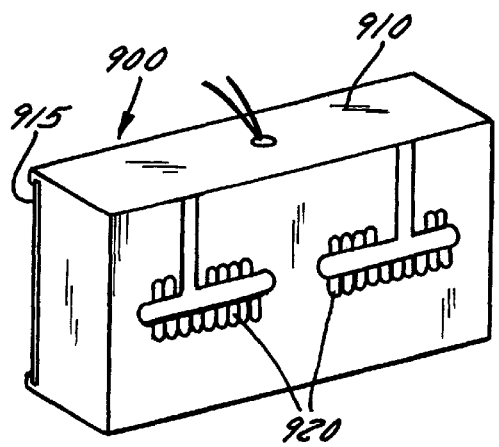
Figure 7C:
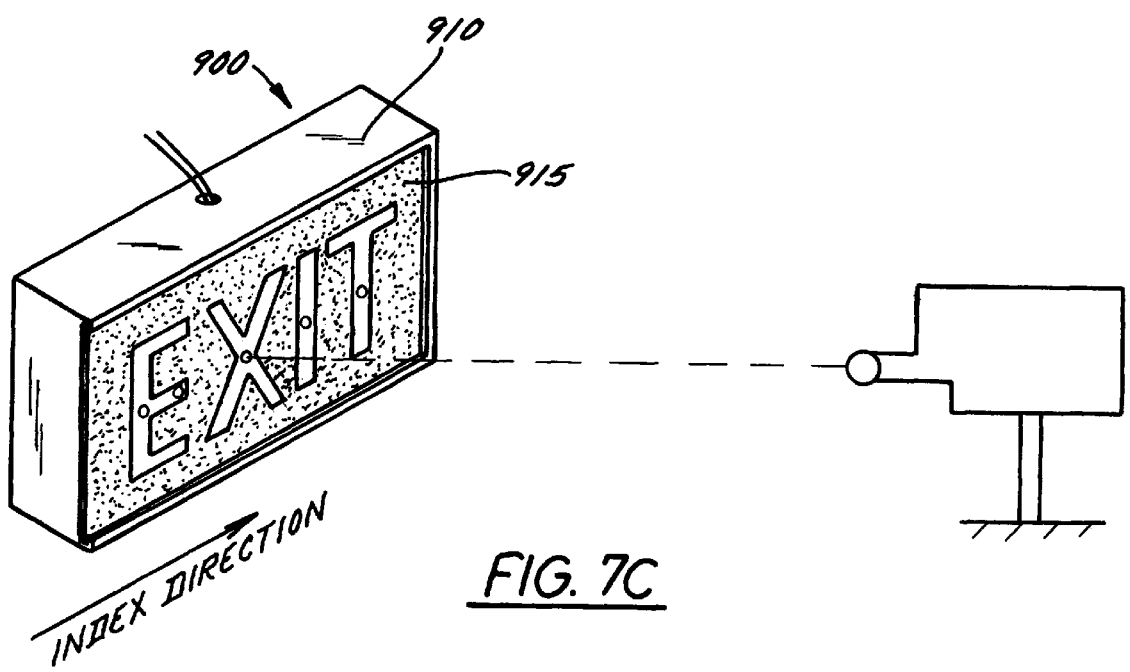

The substrates were tested in similar fashion. Although any type of light display could be used, a standard lighting system for an emergency exit sign housing was used to measure the luminance of different substrates. As seen in FIGS. 7A–C the exit sign housing 900 consists of a metal frame 910 with a metal sliding cover 915 with the word "EXIT" cut out. It is powered by 110 VAC and two banks of light sources 920 in the housing. The three substrates under test were slid into the housing behind the cover. The substrates filtered the LED light before it exited through the word "EXIT" cut out of the metal sliding cover.

As seen in FIGS. 7B–C testing was done using five spots in the center of the sign for measurement. The unit was placed on a one-axis slide and a luminance meter (ToPCom BM) was placed in front of the unit (32" away) and five different spots were measured on the sign. The unit of measurement used was the nit. (Luminance is the brightness of a unit area seen by the eye over a solid angle, taking into account Lambert's Law. Since the measurement was taken normal to the spot, the Lux and Nit are the same.)

Table I are results of brightness measurements of the three different substrates in the display: (i) conventional red silkscreened plastic that is currently used in exit signs (column 2); (ii) red GE Lexan with a clear diffuser laminated thereto (column 3); and (iii) a dyed diffuser replicated on clear GE LExan (column 4).

TABLE I

| | Brightness in Nits | | |
|---|---|---|---|
| Spot Location | Currently Used Red Plastic | Red Plastic +30° Diffusion in clear epoxy | Clear Plastic +30° diffuser in dye-epoxy |
| 1 | 12.6 | 18.5 | 13.8 |
| 2 | 14.3 | 25.4 | 17.5 |
| 3 | 16.6 | 23.0 | 22.0 |
| 4 | 18.9 | 34.0 | 24.5 |
| 5 | 14.8 | 13.6 | 13.0 |

As can be seen from column 3 of this table, the exit sign is brighter than the red silkscreened plastic currently used in exit signs when a clear 30° diffuser is laminated on red plastic. As seen in column 4, higher brightness is also achieved when a dyed 30° diffuser made using epoxy containing red dye (BASF Zapon Red 471) is replicated on clear plastic. Additionally, the combination of a clear GE Lexan with a dyed diffuser thoroughly diffuses the light so that there are no light source artifacts visible and there is complete uniformity of brightness. Manufacturers now desire that exit displays have uniformity of brightness over the entire "EXIT" word cut out and that no light source artifacts be visible. The present invention fulfills these requirements unlike in conventional displays with silk-screened plastic.

One of the most important properties for any dye incorporated into a colored diffuser is the solubility of that dye with regard to the remaining constituents of the composition. To explore the solubility parameters, twenty one different dyes were dissolved in an ultraviolet epoxy varnish (GAFGARD 233). The results of these experiments are presented in Table II.

TABLE II

|    | Die Name | Supplier | Color | Observation |
|----|----------|----------|-------|-------------|
| 1  | Neo Zapon 975 | BASF | Green | D |
| 2  | Cupric Sulfate | Fisher Scientific | Blue | ND |
| 3  | Mordant Orange 10 | Aldrich Chemical | Brown | PD |
| 4  | Merocyanine 540 | Aldrich Chemical | Purple | PD |
| 5  | 2,3 Naphtalocyanine | Aldrich Chemical | Red | ND |
| 6  | Ammonium Cerium Nitrate | Aldrich Chemical | Yellow | ND |
| 7  | Methyl Red | Spectrum Chemical | Red | D |
| 8  | 7,7,8,8-Tetracyano Quinodimethane | Aldrich Chemical | Brown | PD |
| 9  | Phenol Red | Aldrich Chemical | Brown | ND |
| 10 | Copper Phtalocyanine | Kodak | Blue | ND |
| 11 | Sudan IV | Aldrich Chemical | Red | PD |
| 12 | Ponceav S | Aldrich Chemical | Brown | ND |
| 13 | Methyl Orange | Aldrich Chemical | Orange | PD |
| 14 | Mordant Brown | Aldrich Chemical | Purple | D |
| 15 | Amaranth | Aldrich Chemical | Grey | ND |
| 16 | Methylene Blue | Fisher Scientific | Blue | PD |
| 17 | Rose Bengal | Aldrich Chemical | Purple | D |
| 18 | 29H, 31H-Phathalocyanic | Aldrich Chemical | Purple | ND |
| 19 | Janus Green B | Aldrich Chemical | Green | D |
| 20 | Zapon Red 471 | BASF | Red | D |
| 21 | Zapon Red 335 | BASF | Red | PD |

Legend:
D: dissolves completely in Epoxy
*PD: partially dissolves in Epoxy
*ND: Does not dissolve in Epoxy
*It should be noted that when the dye only partially dissolves or does not dissolve at all, a simple cosolvent compatible with epoxy can be used as needed and the dissolving process can then be repeated to make the resulting solution more homogeneous.

The chemical formulae for these dye are contained below:
1. Neo Zapon 975—mixture of phthalocyanine derivative and 1:1 chromium complex dye
2. Cupric Sulfate $CuSO_4$ 3. Mordant Orange 10

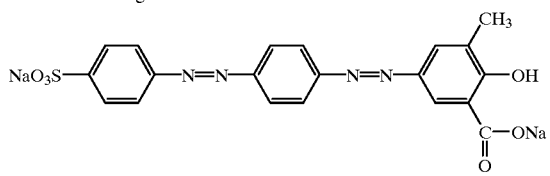

4. Merocyanine 540

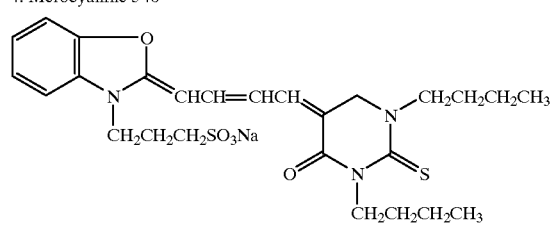

5. 2,3 Naphtalocyanine

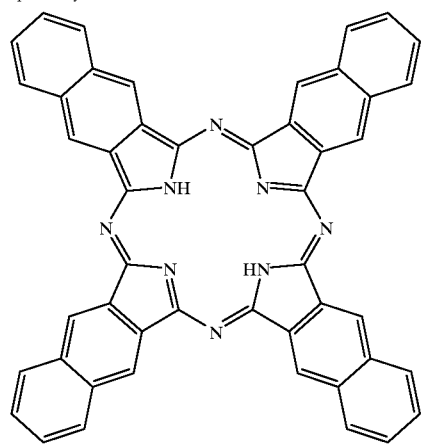

6. Ammonium Cerium Nitrate $$(NH_4)_2Ce(No_3)_6$$

7. Methyl Red-2[4(dimethylamino)phenylazo]benzoic acid

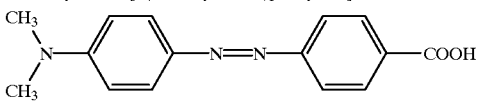

8. 7,7,8,8,-Tetracyano Quinodimethane

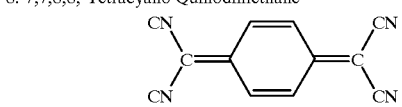

9. Phenol Red
phenosulfone phthalein

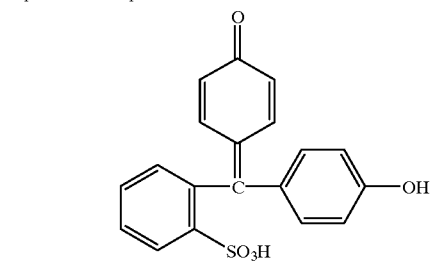

10. Copper Phtalocyanine

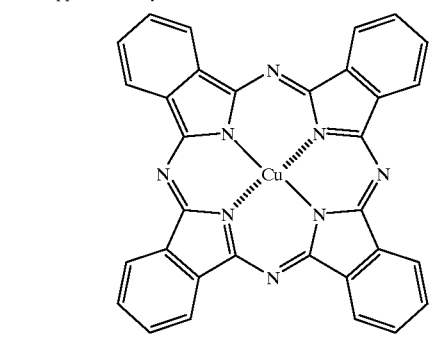

11. Sudan IV

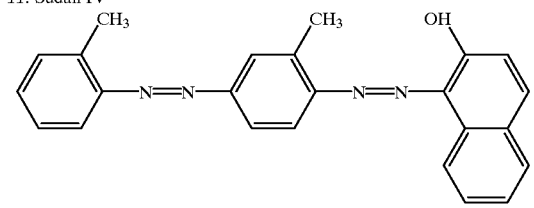

-continued

12. Ponceav S
3-hydroxy-4[2-sulfo-4-(4-sulfophenylazo)phenylazo] 2,7-naphthalene sulfonic acid, tetrasodium salt

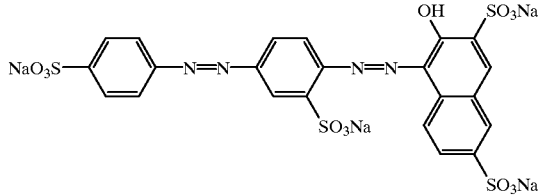

13. Methyl Orange
4[4(dimethylamino)phenylazo] benzonesulfonic acid

14. Mordant Brown

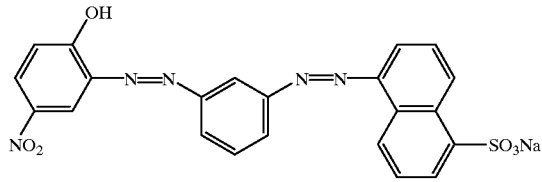

15. Amaranth

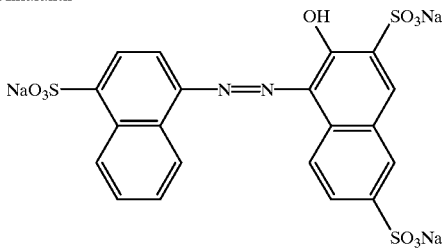

16. Methylene Blue

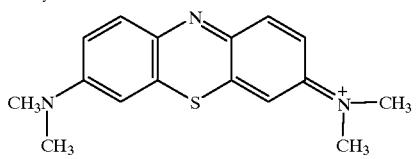

17. Rose Bengal

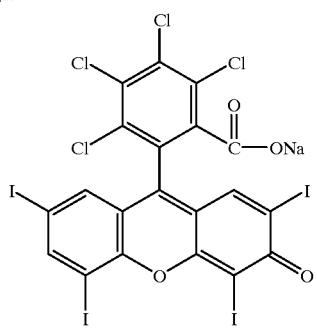

18. 29H, 31H-Phathalocyanine

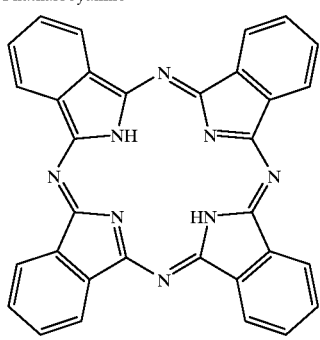

-continued

19. Janus Green B

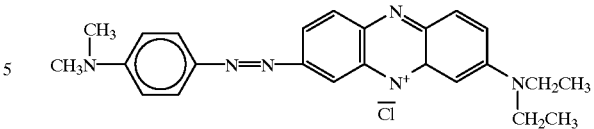

Figure 8:
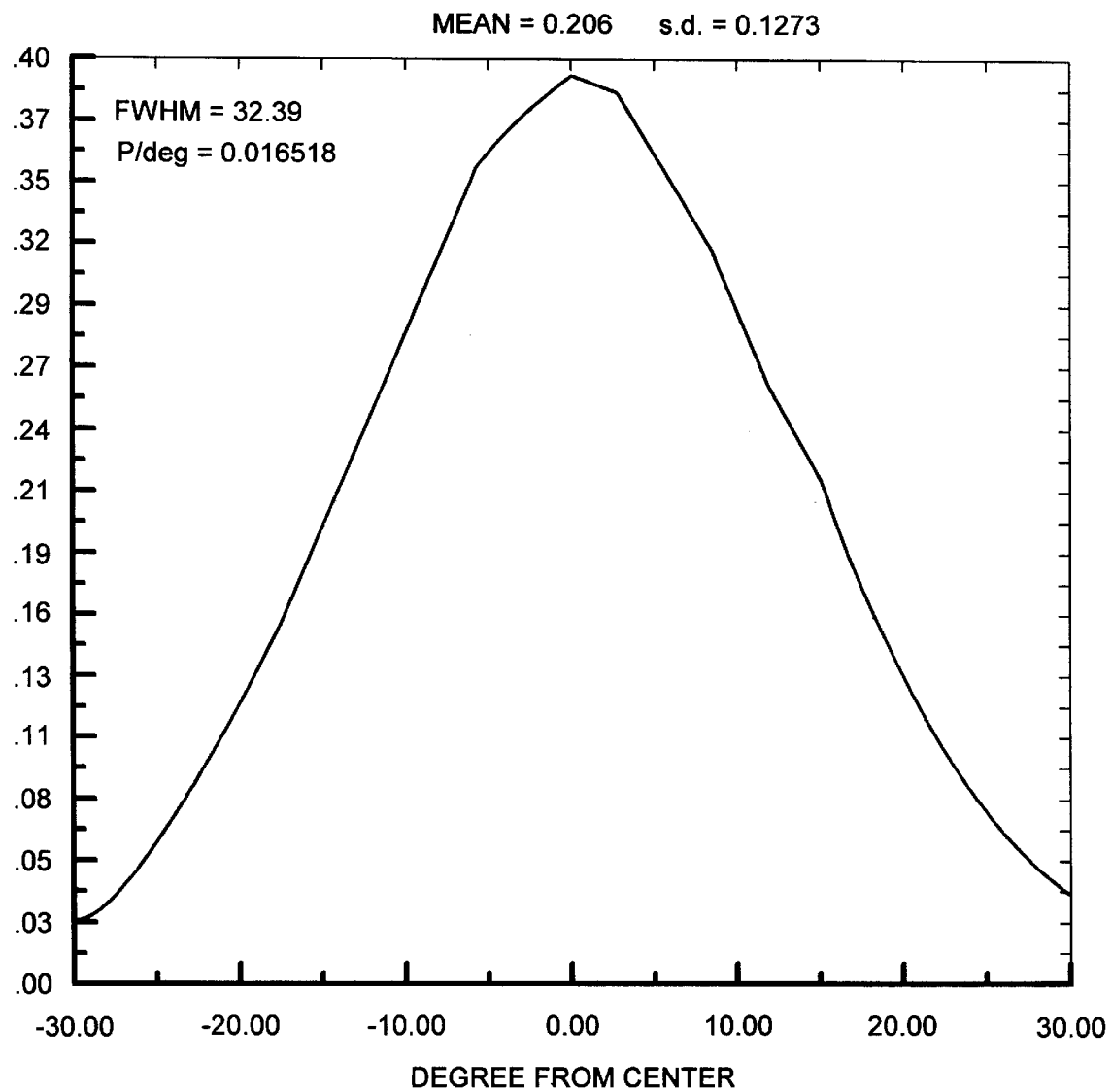
FIG. 8 illustrates light transmission as a function of angle for a diffuser containing 1% Zapon Red 471 color dye, representing an embodiment of the invention.
Figure 9:
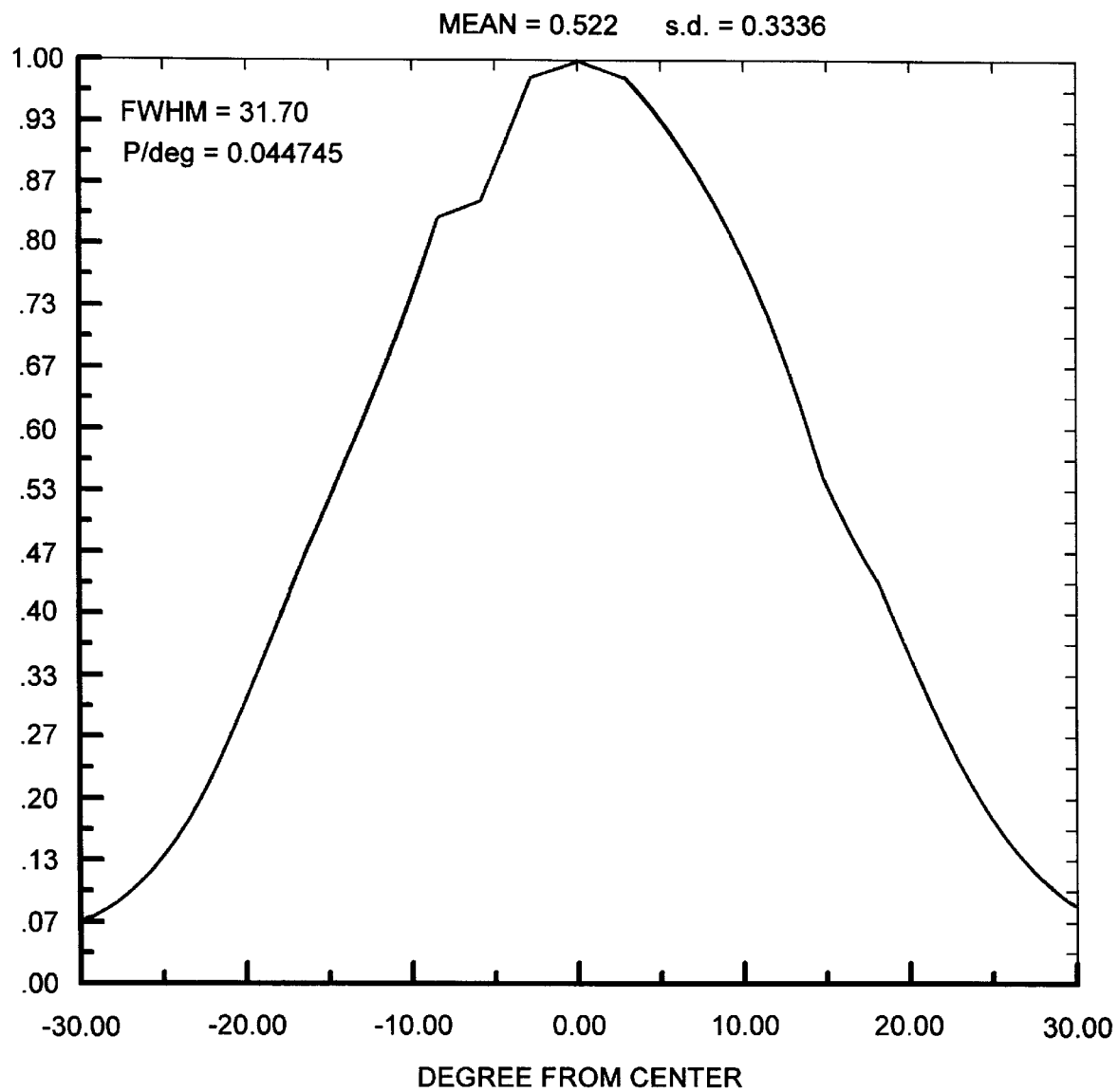
FIG. 9 illustrates light transmission as a function of angle for a diffuser containing 1% Mordant Brown color dye, representing an embodiment of the invention.
Figure 10:
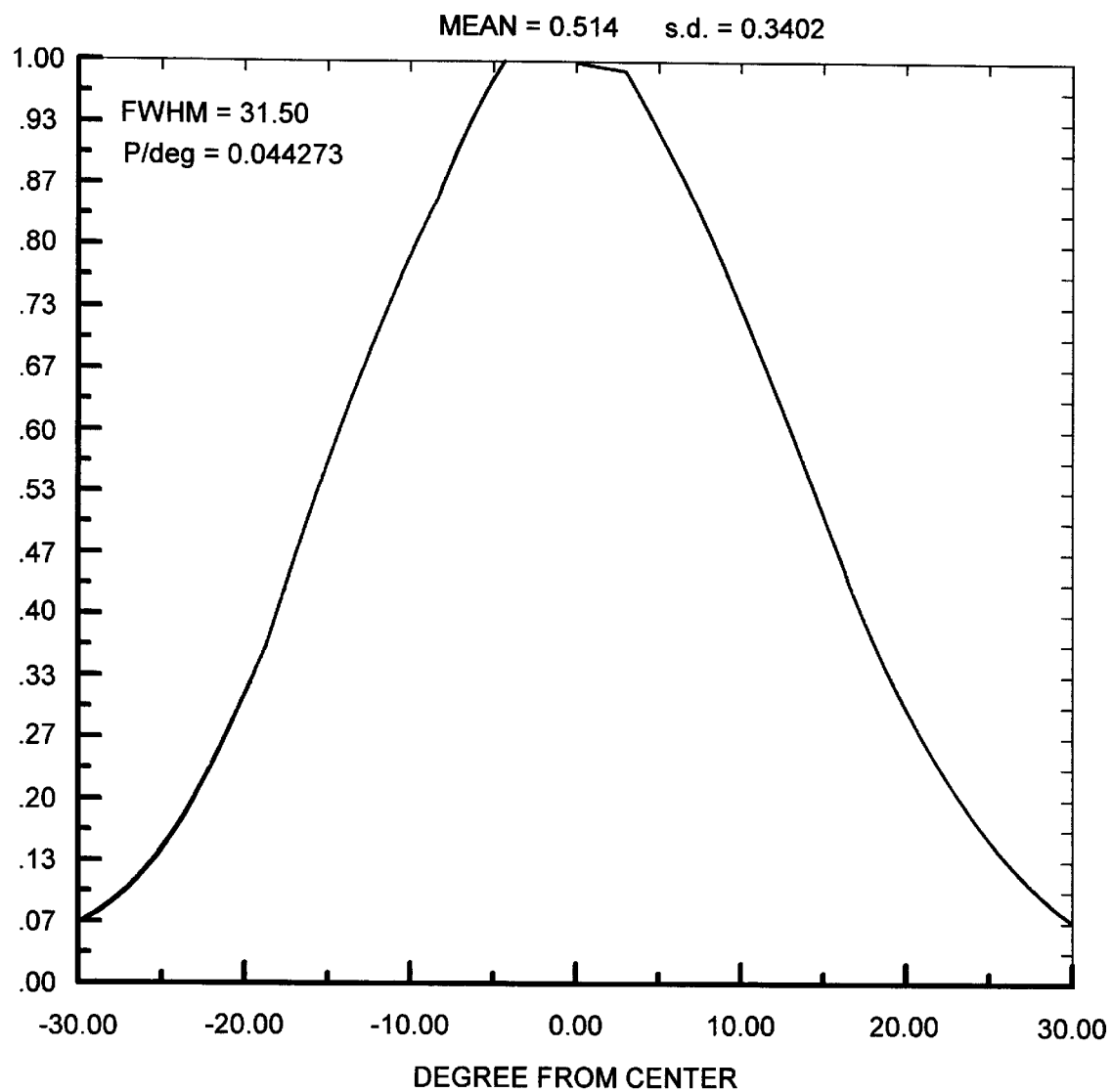
FIG. 10 illustrates light transmission as a function of angle for a diffuser containing 1% Rose Bengal color dye, representing an embodiment of the invention.
Figure 11:
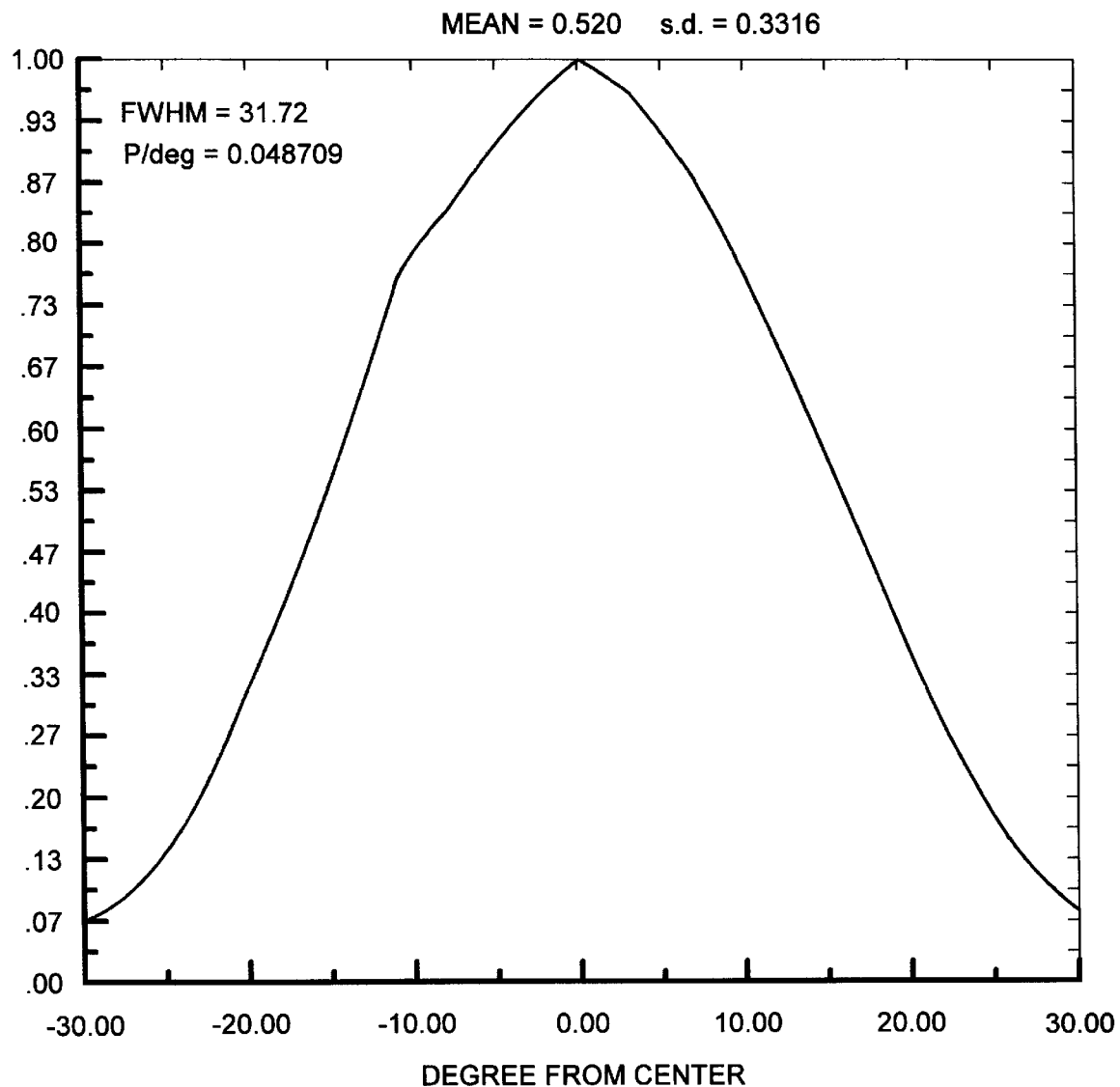
FIG. 11 illustrates light transmission as a function of angle for a diffuser containing Neo Zapon 975 color dye, representing an embodiment of the invention.
Figure 12:
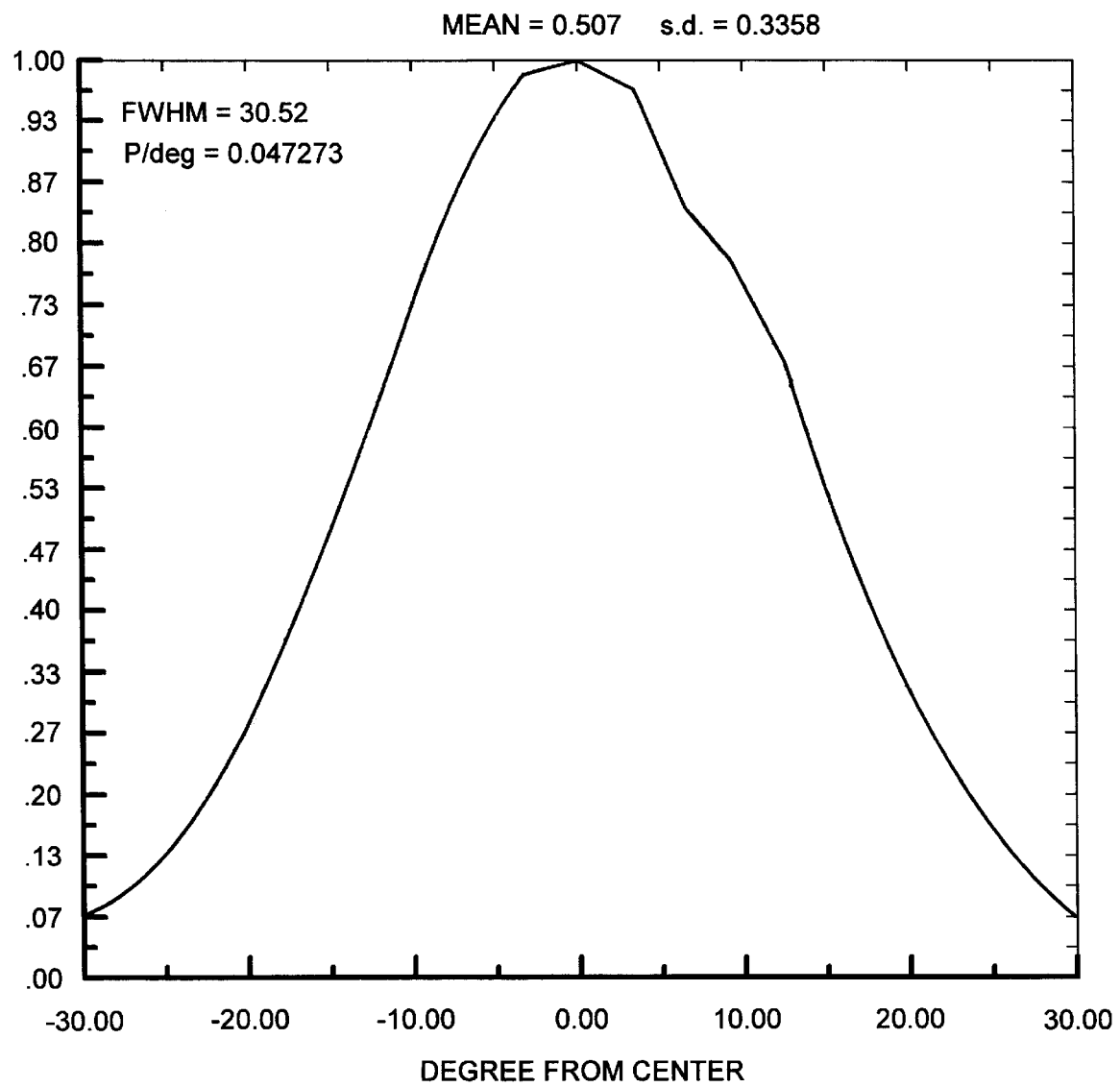
FIG. 12 illustrates light transmission as a function of angle for a diffuser containing 1% Methyl Red color dye, representing an embodiment of the invention.
Figure 13:
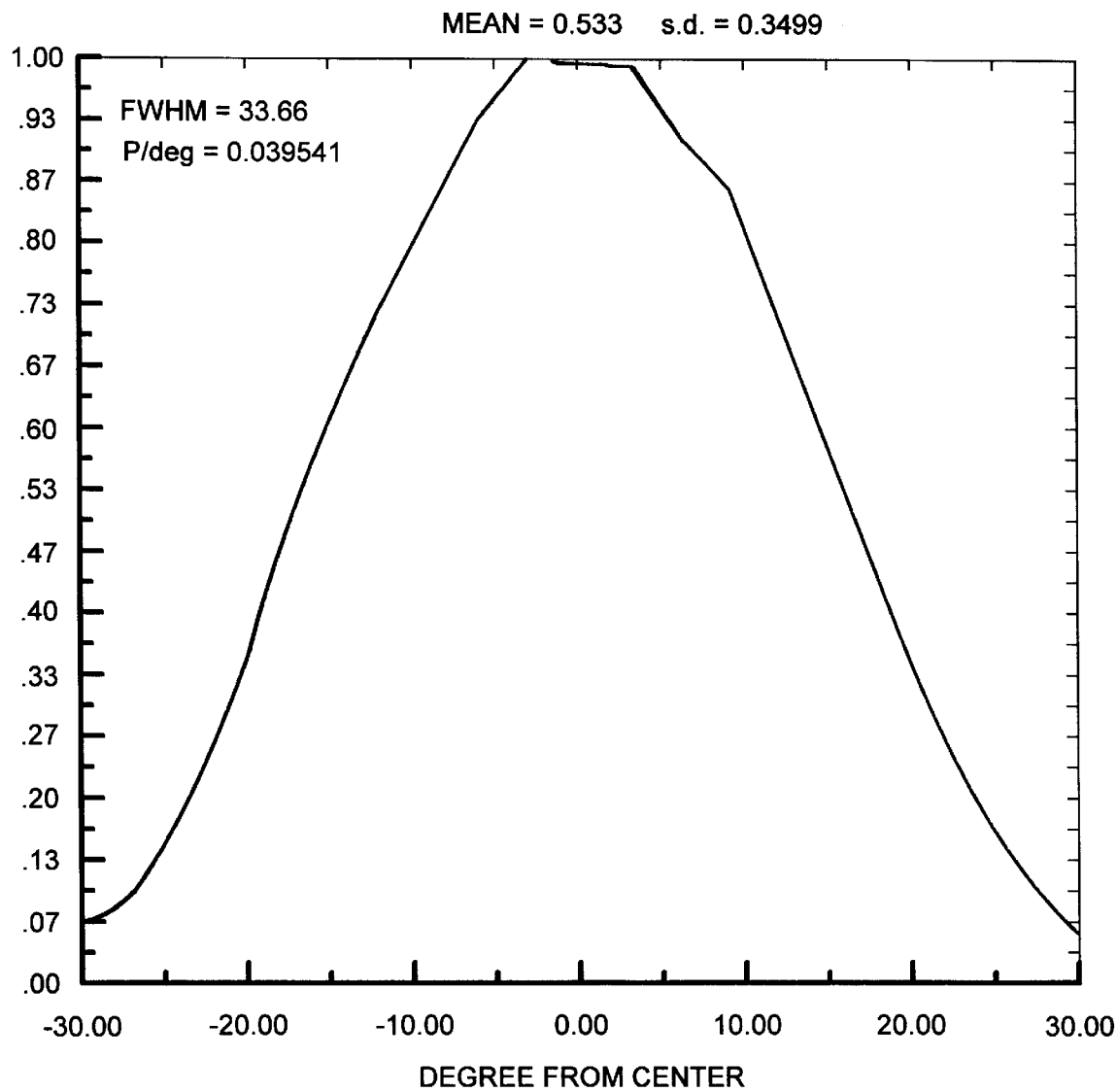
FIG. 13 illustrates light transmission as a function of angle for a diffuser containing 1% Janus Green B color dye, representing an embodiment of the invention.

20. Zapon Red 471—1:2 Cobalt complex dye
21. Zapon Red 335—1:2 Chromium complex dye Referring now to FIG. 8, the angular dispersion characteristics of the 1% by weight Zapon Red 471 sample are presented. Referring now to FIG. 9, the angular dispersion results from the 1% by weight Mordant Brown sample are presented. Referring now to FIG. 10, the angular dispersion results for the 1% by weight Rose Bengal sample are presented. Referring now to FIG. 11, the angular dispersion results for the 1% by weight Neon Zapon 975 sample are presented. Referring now to FIG. 12, the angular dispersion results for the 1% by weight Methyl Red sample are presented. Referring now to FIG. 13, the angular dispersion results for the 1% by weight Janus Green B sample are presented.

Figure 14:
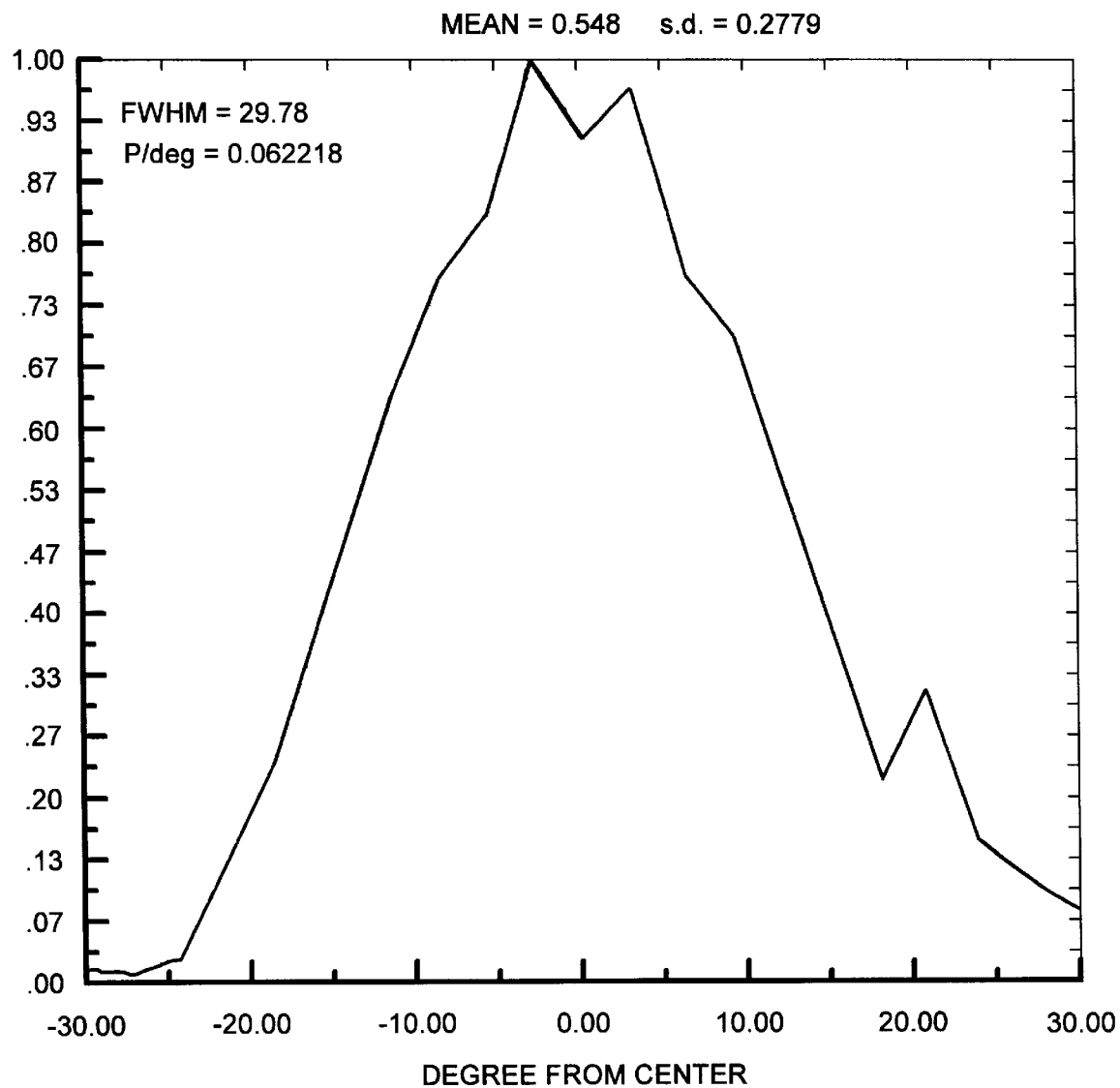
FIG. 14 illustrates light transmission as a function of angle for a sample of plain epoxy on top of a separate green polycarbonate (green GE Lexan) layer.
Figure 15:
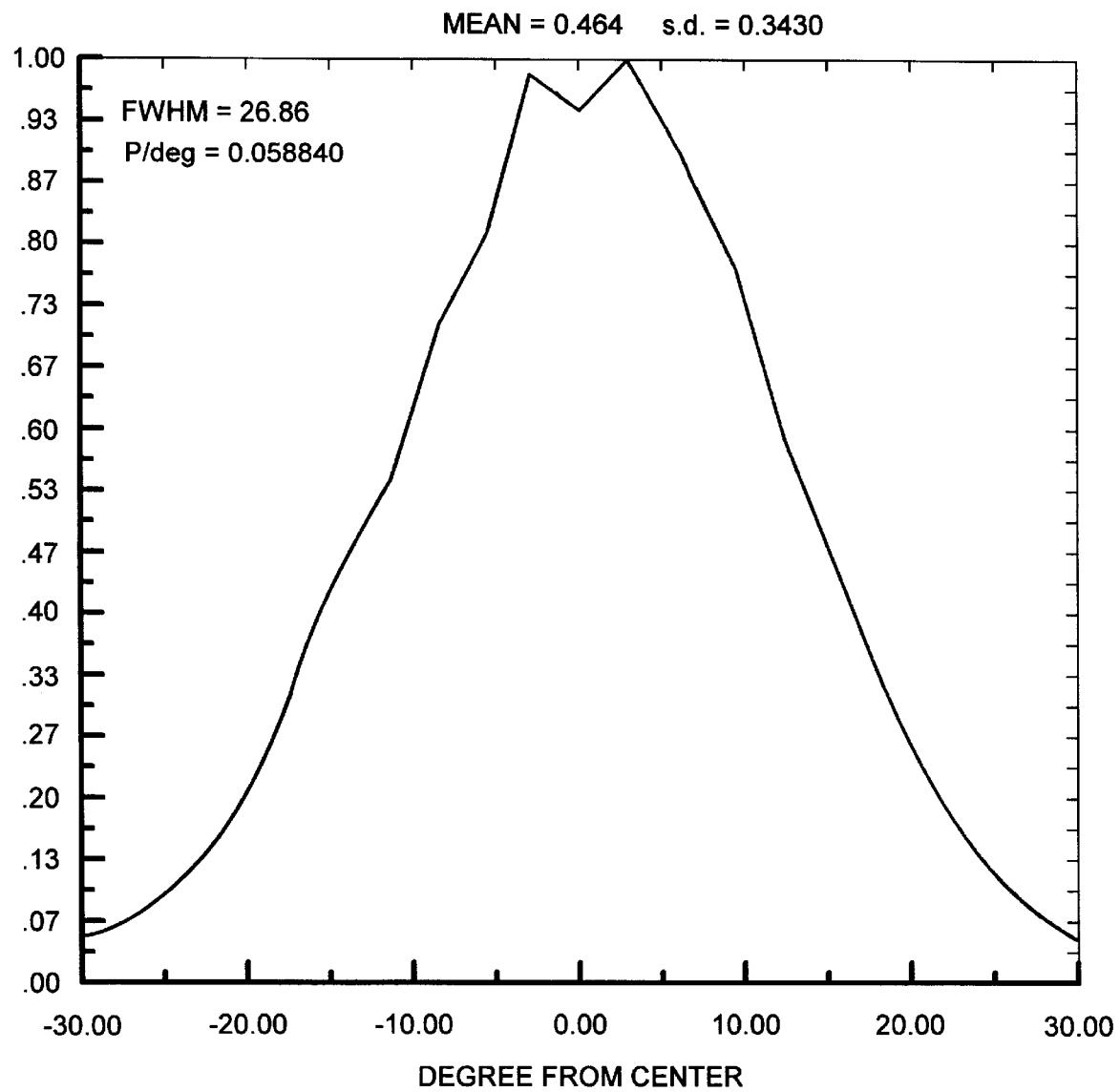
FIG. 15 illustrates light transmission as a function of angle for a sample of plain epoxy on top of a separate red polycarbonate (red GE Lexan) layer.
Figure 16:
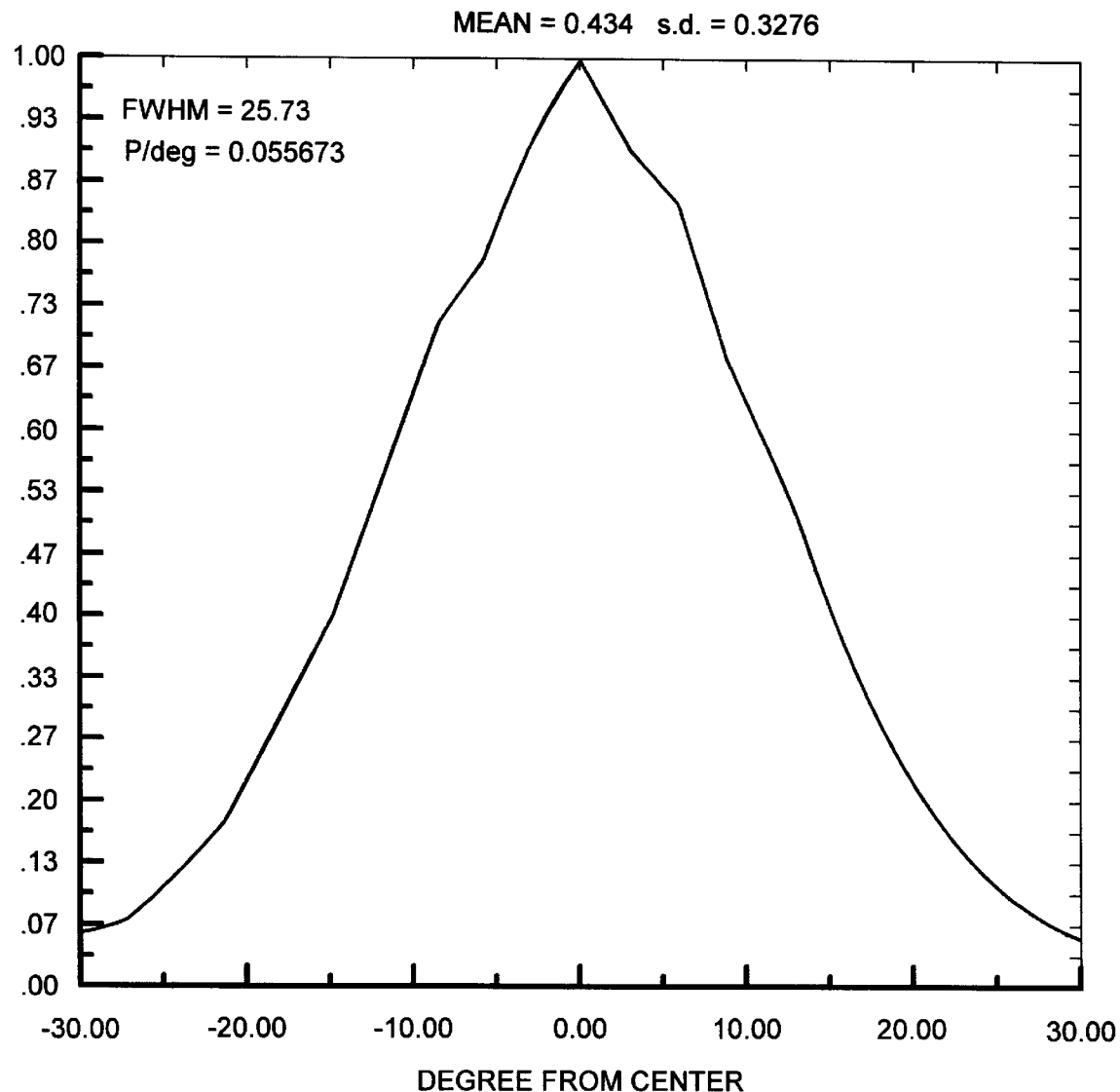
FIG. 16 illustrates light transmission as a function of angle for a diffuser, representing an embodiment of the invention.
Figure 17:
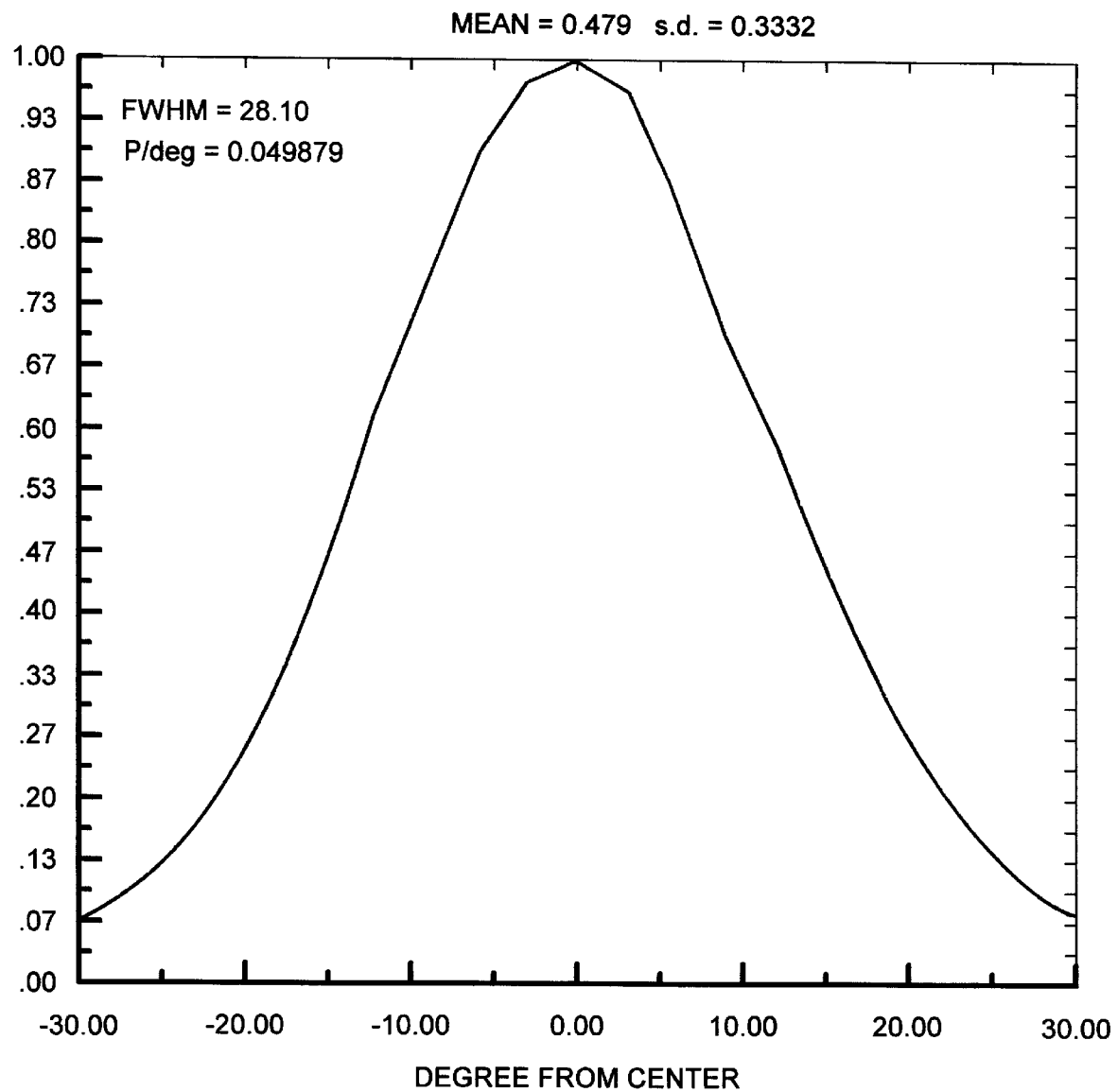
FIG. 17 illustrates light transmission as a function of angle for a diffuser containing 5% Zapon Red 471 color dye in epoxy on top of a separate transparent polycarbonate layer representing an embodiment of the invention.

Referring now to FIG. 16, the angular dispersion results for the noncolored diffuser are presented. Referring now to FIG. 17, the angular dispersion results for the 5% by weight diffuser on polycarbonate are presented. Referring now to FIG. 14, the angular dispersion results for the diffuser replicated on green Lexan are presented. Referring now to FIG. 15, the angular dispersion results for the diffuser replicated on red Lexan are presented.

Practical Applications of the Invention

A practical application of the present invention which has value within the technological arts is transferring a surface topography, such as, for example, a collimating array of microprisms, a surface diffuser, or even a diffraction grating. Further, all the disclosed embodiments of the present invention are useful in conjunction with transferring surface topography patterns such as are used for the purpose of decoration, or the like. There are virtually innumerable uses for the present invention described herein, all of which need not be detailed here.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the process could be enhanced by providing a multi-layer resin layer. Similarly, although a supply roll of carrier material is preferred, any supply of carrier material could be used in its place. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which replicate a surface topography so as to provide a useful product. Further, although the assembly shown in FIG. 1F is described herein as a physically separate module, it will be manifest that the assembly may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. Joel R. Fried, Polymer Science and Technology, Prentice Hall PTR (1995).
2. Bahaa E. A. Saleh & Malvin C. Teich, Fundamentals of Photonics, John Wiley & Sons (1991).
3. Handbook of Optics, 2nd ed., Vols. I–II, McGraw Hill (Michael Bass et al. eds., 1995).
4. Van Nostrand's Scientific Encyclopedia, 8th ed., Van Nostrand Reinhold (Douglas M. Considine et al. eds., 1995).
5. Marks Mechanical Engineering Handbook, 10th ed., McGraw Hill (Eugene A. Avallone et al. eds., 1996).
6. The Electrical Engineering Handbook, CRC Press (Richard C. Dorf et al. eds., 1993).
7. Perry's Chemical Engineers' Handbook, 6th ed., McGraw Hill (Robert H. Perry et al. eds., 1984).
8. Kirk-Othmer, Concise Encyclopedia of Chemical Technology, John Wiley & Sons (Martin Grayson et al. eds., 1985).

What is claimed is:

1. A composition for forming an optical element with light shaping diffusers, comprising:
    an ultraviolet polymerizable varnish including an acrylate and a vinylpyrrolidone; and
    a dye,
    wherein said dye is substantially dissolved in said composition.

2. The composition of claim 1, wherein said acrylate is pentaerythritol triacrylate.

3. The composition of claim 1, wherein said dye includes 7,7,8,8-tetracyano quinodimethane.

4. A method of making the composition of claim 1, comprising the steps of: combining said ultraviolet polymerizable varnish and said dye to form a mixture.

5. The method of claim 4; comprising the steps of:
    combining an ultraviolet polymerizable varnish and a dye to form a mixture and filtering said mixture to form a filtrate.

6. The method of claim 5, further comprising centrifuging said filtrate.

7. An apparatus, comprising a replica, said replica including a polymerized varnish including an acrylate and a vinylpyrrolidone and a dye, wherein said dye is at least partially dissolved in said polymerized varnish.

8. The apparatus of claim 7, further comprising a substrate.

9. An apparatus, comprising a replica, said replica including a polymerized varnish, a liquid crystal display and a dye, wherein said dye is at least partially dissolved in said polymerized varnish.

10. A method of preparing a replica, comprising:
    combining a polymerizable varnish and a dye to form a composition, wherein the said dye is at least partially dissolved in said composition; and
    replicating a surface topography with said composition.

11. The method of claim 10, wherein replicating includes ultraviolet curing said composition.

12. The method of claim 10, further comprising filtering said composition to form a filtrate before the step of replicating.

13. The method of claim 12, further comprising centrifuging said filtrate before the step of replicating.

14. A replica prepared by a process comprising the steps of:
    combining an ultraviolet polymerizable varnish and a dye to form a composition, wherein said dye is at least partially dissolved in said composition; and
    replicating a surface topography with said composition.

15. The replica of claim 14, further comprising a substrate.

16. The replica of claim 14, further comprising a liquid crystal display.

17. A composition for replicating an optical element, said composition comprising:
    a first mixture comprising:
        an acrylated aliphatic urethane oligomer/monomer blend and
        a tripropylene glycol diacrylate;
    an isobornyl acrylate;
    a β-Carboxyethyl acrylate in an amount of between approximately 12 wt. % and approximately 25 wt. %;
    a photoinitiator; and
    an N-vinyl-2-pyrrolidone.

18. The composition of claim 17, wherein said isobornyl acrylate includes 2-Propenoic acid, 1,7,7,-trimethylbicyclo [2.2.1]hept-2-yl.

19. The composition of claim 17, wherein said β-Carboxyethyl acrylate includes 2-Propenoic acid and 2-carboxyethyl ester.

20. The composition of claim 17, wherein said photoinitiator includes 2-Hydroxy-2-methyl-1-phenyl-propan-1-one.

21. The composition of claim 17, wherein said composition comprises from approximately 0.5 wt % to approximately 3 wt % of said photoinitiator.

22. The composition of claim 17, wherein said composition comprises approximately 62 wt % of said mixture and approximately 18 wt % of said β-Carboxyethyl acrylate.

23. The composition of claim 17, wherein said composition further includes a dye.

24. A method of making the composition of claim 17, comprising the steps of:
    combining said first mixture, said isobornyl acrylate, said β-Carboxyethyl acrylate, said photoinitiator, said N-vinyl-2-pyrrolidone, and said dye to form a second mixture.

25. The method of claim 24, further comprising filtering said second mixture to form a filtrate.

26. The method of claim 25, further comprising centrifuging said filtrate.

27. An apparatus for producing a replica, said replica prepared from a composition comprising:
    a first mixture comprising:
        an acrylated aliphatic urethane oligomer/monomer blend and
        a tripropylene glycol diacrylate;
    an isobornyl acrylate;
    a β-Carboxyethyl acrylate in an amount of between approximately 12 wt. % and approximately 25 wt. %;
    a photoinitiator; and
    an N-vinyl-2-pyrrolidone.

28. A method for producing a replica comprising the steps of:
combining:
a first mixture comprising:
an acrylated aliphatic urethane oligomer/monomer blend and
a tripropylene glycol diacrylate;
an isobornyl acrylate;
a β-Carboxyethyl acrylate in an amount of between approximately 12 wt. % and approximately 25 wt. %;
a photoinitiator; and
an N-vinyl-2-pyrrolidone to form a composition; and
replicating a surface topography with said composition to produce the replica.

29. The method of claim 28, wherein replicating includes ultraviolet curing said composition.

30. A replica prepared by a process comprising the steps of:
combining
a first mixture comprising:
an acrylated aliphatic urethane oligomer/monomer blend and
a tripropylene glycol diacrylate;
an isobornyl acrylate;
a β-Carboxyethyl acrylate in an amount of between approximately 12 wt. % and approximately 25 wt. %;
a photoinitiator; and
an N-vinyl-2-pyrrolidone to form a composition; and
replicating a surface topography with said composition to produce a replica.

31. The composition of claim 22, further comprising approximately 1 wt % of said photo initiator and approximately 5 wt % of said N-vinyl-2-pyrrolidone.

32. The apparatus of claim 27, further comprising a dye.

33. The method of claim 28, wherein the step of combing further comprises adding a dye to said first mixture.

34. The method of claim 28, further comprising depositing said composition on a transparent substrate.

35. The method of claim 28, wherein said replica has a replication side.

36. The method of claim 35, further comprising the step of:
laminating the replication side to a substrate with an index of refraction matching material, wherein said replica is a collimating backlight for a liquid crystal display system.

37. The replica of claim 30, wherein the process further comprises combining a dye with said composition.

38. A replica of claim 30, wherein the process further comprises depositing said composition on a transparent substrate.

39. A replica of claim 30, wherein said replica has a replication side.

40. The replica of claim 39, further comprising the step of:
laminating the replication side to a substrate with an index of refraction matching material, wherein said replica is a collimating backlight for a liquid crystal display system.

41. A composition, said composition comprising:
a mixture including an acrylated aliphatic urethane oligomer/monomer blend and a tripropylene glycol diacrylate;
an isobornyl acrylate;
a β-Carboxyethyl acrylate;
a photoinitiator;
an N-vinyl-2-pyrrolidone; and
a dye, wherein the dye is at least partially dissolved in said composition, and wherein said composition includes from approximately 12 wt. % to approximately 25 wt. % of said β-Carboxyethyl acrylate and from approximately 0.5 wt. % to approximately 3 wt. % of said photoinitiator.

42. A composition, said composition comprising:
a mixture including an acrylated aliphatic urethane oligomer/monomer blend and a tripropylene glycol diacrylate;
an isobornyl acrylate;
a β-Carboxyethyl acrylate;
a photoinitiator;
an N-vinyl-2-pyrrolidone and
a dye, wherein the dye is at least partial dissolved in said composition, and wherein said composition includes approximately 62 wt. % of said mixture, approximately 14% of said isobornyl acrylate, approximately 18 wt. % of said β-Carboxyethyl acrylate, approximately 1 wt. % of said photoinitiator and approximately 5 wt. % of said N-vinyl-2-pyrrolidone.

43. A composition for producing a submaster for a large scale topography, said composition comprising:
a mixture including an acrylated aliphatic urethane oligomer/monomer blend and a tripropylene glycol diacrylate;
an isobornyl acrylate;
an ultraviolet polymerizing varnish including an acrylate and a vinylpyrrolidone;
a surfactant; and
a photoinitiator.

44. A composition for producing a replica for a large scale topography, said composition comprising:
a mixture including
an acrylated aliphatic urethane oligomer/monomer blend and
a tripropylene glycol diacrylate;
an isobornyl acrylate;
a β-Carboxyethyl acrylate;
a photoinitiator; and
an N-vinyl-2-pyrrolidone.

45. A composition for producing a submaster for a small scale topography, said composition comprising:
a surface diffuser including an ultraviolet polymerizing varnish comprising:
between approximately 93.0%–96.0% of a mixture including;
a fluoro alkyl ester; and
an acrylated epoxy; and
between approximately 4.0%–7.0% of a surfactant.

46. The composition for producing a replica for a small scale topography of claim 45 wherein the surface diffuser comprises:
pentaerythritol triacrylate and vinylpyrrolidone.

47. An object having a surface topography defining a plurality of optical elements that diffuse light, said surface topography comprising a periodic series of isosceles triangular prisms, wherein said optical elements are formed from a composition comprising:
an ultraviolet polymerizable varnish; and
a dye, wherein said dye is at least partially dissolved in said composition.

48. An object of claim 47, wherein said surface topography has a depth of approximately 0.2 μm to approximately 200 μm.

49. An object of claim 48, wherein said surface topography has a depth of approximately 1 μm to approximately 100 μm.

50. An object of claim 47, wherein said optical elements have a depth to width ratio of between approximately 2:1 and approximately 20:1.

51. An object of claim 47, wherein each of said optical elements has a width of at least approximately 0.1 μm.

52. An object of claim 51, wherein each of said optical elements has a width of 10 μm.

53. An object of claim 47, wherein each of said optical elements has a bottom plateau having a width of at least approximately 0.1 μm.

54. An object of claim 53, wherein each of said optical elements has a bottom plateau having a width of at least approximately 10 μm.

55. An object having a surface topography defining a plurality of optical elements that diffuse light, said surface topography comprising a periodic series of isosceles triangular prisms, wherein said optical elements are formed from
a first mixture comprising:
  an acrylated aliphatic urethane oligomer/monomer blend and
  a tripropylene glycol diacrylate; an isobornyl acrylate;
  a β-Carboxyethyl acrylate in an amount of between approximately 12 wt. % and approximately 25 wt. %;
  a photoinitiator; and
an N-vinyl-2-pyrrolidone.

56. The method of claim 33, further comprising filtering said composition to form a filtrate before the step of replicating.

57. The method of claim 56, further comprising centrifuging said filtrate before the step of replicating.

* * * * *